US009145956B2

(12) United States Patent
Miller

(10) Patent No.: US 9,145,956 B2
(45) Date of Patent: Sep. 29, 2015

(54) TORQUE SHARING DRIVE AND TORQUE SHARING PROCESS

(71) Applicant: FAIRFIELD MANUFACTURING COMPANY, INC., Lafayette, IN (US)

(72) Inventor: Richard W. Miller, Indianapolis, IN (US)

(73) Assignee: GustoMSC Resources B.V., Schiedam (NL)

( * ) Notice: Subject to any disclaimer, the term of this patent is extended or adjusted under 35 U.S.C. 154(b) by 211 days.

(21) Appl. No.: 13/750,781

(22) Filed: Jan. 25, 2013

(65) Prior Publication Data

US 2014/0208894 A1     Jul. 31, 2014

(51) Int. Cl.
*F16H 19/04* (2006.01)
*F16H 1/22* (2006.01)
*F16H 57/12* (2006.01)

(52) U.S. Cl.
CPC *F16H 19/04* (2013.01); *F16H 1/22* (2013.01); *F16H 2057/121* (2013.01); *Y10T 74/1967* (2015.01); *Y10T 74/19079* (2015.01); *Y10T 74/19623* (2015.01); *Y10T 74/19628* (2015.01)

(58) Field of Classification Search
CPC ..... F16H 1/22; F16H 19/04; F16H 2057/121; Y10T 74/19623; Y10T 74/19628; Y10T 74/1967
USPC ................................... 74/399, 410, 422, 409
See application file for complete search history.

(56) References Cited

U.S. PATENT DOCUMENTS

| 2,069,882 | A | | 2/1937 | Hall | |
|---|---|---|---|---|---|
| 2,441,901 | A | * | 5/1948 | Petersen | 74/421 R |
| 2,666,396 | A | | 1/1954 | Kruse | |
| 2,696,125 | A | | 12/1954 | Saari | |
| 2,726,726 | A | * | 12/1955 | Le Tourneau | 180/65.51 |
| 2,920,497 | A | * | 1/1960 | Wiken | 74/410 |
| 2,954,704 | A | | 10/1960 | Saari | |
| 3,016,989 | A | | 1/1962 | Lindmark | |

(Continued)

FOREIGN PATENT DOCUMENTS

| EP | 1128974 B1 | | 9/2005 |
|---|---|---|---|
| WO | WO 98/36192 | * | 8/1998 |

OTHER PUBLICATIONS

Spur Gear Terms and Concepts, Gears Educational Systems LLC, www.gearseds.com, Hanover Massachusetts, pp. 1-19.

(Continued)

*Primary Examiner* — William C Joyce
(74) *Attorney, Agent, or Firm* — Banner & Witcoff, Ltd.

(57) ABSTRACT

A torque sharing drive and process for sharing torque accommodates tooth inaccuracies on the rack and outer pinions. A driving pinion mates with first and second gears. The driving pinion is radially, bidirectionally, movable in response to gear separation forces only along the line between the centers of the driving pinion, the first gear and the second gear. First and second outer pinions are rotatable with the first and second gears, and as the driving pinion moves radially toward the first or second gear in response to gear separation forces, the first or second gear is angularly and rotationally advanced with respect to the other gear accommodating inaccuracies in the teeth of the rack and outer pinions. Alternatively, when gear separation forces are balanced, the driving pinion resides approximately equidistantly intermediate the first and second gear and the first and second outer pinions are approximately in phase.

25 Claims, 29 Drawing Sheets

(56) References Cited

U.S. PATENT DOCUMENTS

| | | | |
|---|---|---|---|
| 3,105,395 A * | 10/1963 | Perkins | 74/745 |
| 3,237,483 A | 3/1966 | Kelley et al. | |
| 3,313,376 A | 4/1967 | Holland, Sr. | |
| 3,415,343 A | 12/1968 | Svensson | |
| 3,743,247 A | 7/1973 | Willke et al. | |
| 3,905,250 A * | 9/1975 | Sigg | 74/665 B |
| 3,924,710 A | 12/1975 | Shohet | |
| 4,022,429 A | 5/1977 | Yonekura | |
| RE29,539 E | 2/1978 | Willke et al. | |
| 4,116,085 A | 9/1978 | Bishop | |
| 4,116,251 A | 9/1978 | Graney | |
| 4,160,538 A | 7/1979 | Armstrong | |
| 4,190,135 A | 2/1980 | Wenzel et al. | |
| 4,203,576 A | 5/1980 | Sutton | |
| 4,229,991 A | 10/1980 | Douglas et al. | |
| 4,269,392 A | 5/1981 | Andersen | |
| 4,269,543 A | 5/1981 | Goldman et al. | |
| 4,279,553 A | 7/1981 | Cleary | |
| 4,292,732 A | 10/1981 | Tucci | |
| 4,293,054 A | 10/1981 | Pieri | |
| 4,354,375 A | 10/1982 | Lesowsky | |
| 4,356,973 A | 11/1982 | Lawson | |
| 4,386,757 A | 6/1983 | Vezole | |
| 4,387,881 A | 6/1983 | McDuffie | |
| 4,399,719 A * | 8/1983 | Chszaniecki et al. | 74/410 |
| 4,430,902 A | 2/1984 | McClure | |
| 4,431,343 A | 2/1984 | Uchiyama et al. | |
| 4,443,000 A | 4/1984 | Harvard | |
| 4,453,858 A | 6/1984 | Guiader | |
| 4,456,224 A | 6/1984 | Havard | |
| 4,478,102 A | 10/1984 | Ackermann et al. | |
| 4,482,272 A | 11/1984 | Colin | |
| 4,497,591 A | 2/1985 | Gillis | |
| 4,512,553 A | 4/1985 | Dunham et al. | |
| 4,516,663 A | 5/1985 | Dalessio et al. | |
| 4,602,521 A | 7/1986 | Bishop et al. | |
| 4,638,676 A | 1/1987 | Lively et al. | |
| 4,655,640 A | 4/1987 | Gillis | |
| 4,658,664 A | 4/1987 | Jacobs et al. | |
| 4,662,787 A | 5/1987 | Tatsuguchi | |
| 4,674,350 A | 6/1987 | Zaunberger et al. | |
| 4,678,165 A | 7/1987 | Eloranta | |
| RE32,589 E | 2/1988 | Goldman et al. | |
| 4,791,832 A | 12/1988 | McCaw | |
| 4,792,121 A | 12/1988 | Annas, Sr. et al. | |
| 4,809,814 A | 3/1989 | St-Germain | |
| 4,811,930 A | 3/1989 | Riedl | |
| 4,813,814 A | 3/1989 | Shibuta et al. | |
| 4,830,337 A | 5/1989 | Ichiro et al. | |
| 4,876,908 A * | 10/1989 | Pengilly | 74/410 |
| 4,885,698 A | 12/1989 | Kawasaki | |
| 4,901,982 A | 2/1990 | Havard et al. | |
| 4,967,733 A | 11/1990 | Rousseau | |
| 5,018,402 A * | 5/1991 | Roerig et al. | 475/347 |
| 5,020,777 A | 6/1991 | Yocum | |
| 5,125,290 A | 6/1992 | Cotter | |
| 5,139,366 A | 8/1992 | Choate et al. | |
| 5,161,424 A | 11/1992 | Saberton et al. | |
| 5,170,994 A | 12/1992 | Riedl et al. | |
| 5,183,236 A | 2/1993 | Droulon | |
| 5,233,389 A | 8/1993 | Deguchi et al. | |
| 5,406,859 A | 4/1995 | Belford | |
| 5,595,251 A | 1/1997 | Cook, Jr. | |
| 5,797,703 A | 8/1998 | Delamatyr | |
| 5,906,457 A | 5/1999 | Choate et al. | |
| 5,915,882 A | 6/1999 | Darwiche et al. | |
| 5,941,124 A | 8/1999 | Tan | |
| 6,039,508 A | 3/2000 | White | |
| 6,076,996 A | 6/2000 | Choate et al. | |
| 6,206,345 B1 | 3/2001 | Lenahan et al. | |
| 6,224,037 B1 | 5/2001 | Novick | |
| 6,231,269 B1 | 5/2001 | Shear et al. | |
| 6,325,738 B1 | 12/2001 | Caringella et al. | |
| 6,386,060 B1 | 5/2002 | Epshteyn | |
| 6,431,795 B2 | 8/2002 | White | |
| 6,523,647 B2 | 2/2003 | Duplessis | |
| 6,543,305 B1 | 4/2003 | Van Cor | |
| 6,581,910 B1 | 6/2003 | Granata | |
| 6,588,293 B2 | 7/2003 | Tsubouchi et al. | |
| 6,595,077 B1 | 7/2003 | Geiberger et al. | |
| 6,599,217 B2 | 7/2003 | Caringella et al. | |
| 6,634,979 B1 | 10/2003 | Quaife | |
| 6,652,194 B2 | 11/2003 | Ingle | |
| 6,689,252 B1 | 2/2004 | Shamouilian et al. | |
| 6,705,802 B2 | 3/2004 | Radwan | |
| 6,851,327 B2 | 2/2005 | Lee | |
| 6,912,786 B2 | 7/2005 | Jinkins et al. | |
| 6,981,483 B1 | 1/2006 | Keip | |
| 6,981,822 B2 | 1/2006 | Ingle | |
| 6,997,076 B2 | 2/2006 | Menjak et al. | |
| 7,011,471 B2 | 3/2006 | Ingle | |
| 7,222,550 B2 | 5/2007 | Siraky et al. | |
| 7,258,313 B2 | 8/2007 | Gabriel | |
| 7,258,510 B2 | 8/2007 | Kawasaki | |
| 7,334,642 B2 | 2/2008 | Doering et al. | |
| 7,581,463 B2 | 9/2009 | Jacobs et al. | |
| 7,581,714 B2 | 9/2009 | Machu | |
| 7,677,131 B2 | 3/2010 | Chapelain et al. | |
| 7,814,809 B2 | 10/2010 | Shinohara | |
| 7,930,951 B2 | 4/2011 | Eickholt | |
| 7,980,152 B2 | 7/2011 | Arlt | |
| 8,015,900 B2 | 9/2011 | Gmirya | |
| 8,069,954 B2 | 12/2011 | Kempf | |
| 8,104,368 B2 | 1/2012 | Aaron | |
| 8,113,125 B2 | 2/2012 | Hepner et al. | |
| 8,113,742 B2 | 2/2012 | Kaarstad | |
| 8,133,146 B2 | 3/2012 | Radzevich et al. | |
| 8,216,108 B2 | 7/2012 | Montestruc | |
| 8,276,474 B2 | 10/2012 | Kim et al. | |
| 2002/0152825 A1 | 10/2002 | Adams et al. | |
| 2004/0221670 A1 | 11/2004 | Becker et al. | |
| 2005/0009661 A1 | 1/2005 | Kerr | |
| 2005/0011307 A1 * | 1/2005 | Gmirya | 74/665 GA |
| 2005/0063787 A1 | 3/2005 | Ingle | |
| 2005/0181905 A1 | 8/2005 | Ali et al. | |
| 2005/0260040 A1 | 11/2005 | Ingle et al. | |
| 2007/0138451 A1 | 6/2007 | Hsu | |
| 2007/0295136 A1 | 12/2007 | Fleming | |
| 2008/0116427 A1 | 5/2008 | Machu | |
| 2008/0210915 A1 | 9/2008 | Ruan | |
| 2008/0223163 A1 | 9/2008 | Yamazaki et al. | |
| 2010/0064834 A1 | 3/2010 | Takeuchi et al. | |
| 2010/0132495 A1 | 6/2010 | Bernier | |
| 2010/0144484 A1 | 6/2010 | Bawks | |
| 2010/0261568 A1 | 10/2010 | Radzevich et al. | |
| 2011/0253953 A1 | 10/2011 | Tanaka | |
| 2011/0262182 A1 | 10/2011 | Awano | |
| 2012/0181490 A1 | 7/2012 | Guyard | |

OTHER PUBLICATIONS

Rey, Dr. Gonzalo Gonzalez, Higher Contact Ratios for Quieter Gears, gearsolutions.com, pp. 20-27, Jan. 2009.
Basics of Mechanisms, Chapter One, pp. 1-20.
Obsieger, B., The Special Toothing for Rack and Pinion of Jacking System on Offshore Platforms, Advanced Engineering, 4(2010), ISSN 1846-5900, Edu-Point, pp. 45-54.
Goldfarb et al, An Advanced Approach to Optimal Gear Design, Gear Solutions, gearsolutionsonline.com, Aug. 2008, pp. 40-51.
Zhang et al, Introduction to Mechanisms, Rapid Design Through Virtual and Physical Prototyping, Chapter 7 Gears, Carnegie Mellon University, pp. 1-12.
Simionescu, AC 2008-1325: Interactive Involute Gear Analysis and Tooth Profile Generation Using Working Model 2D, American Society for Engineering Education, 2008, pp. 1-13.
Involute Gear Equations, UTS Gear Gear Design and Manufacturing Software, UTS Software, pp. 1-5.
The ABC's of Gears, Basic Guide-B, Kohara Gear Industry Co. Ltd., September 1, 2007, pp. 1-40.
Walton, Gear Manual, Martin Sprocket & Gear, Inc., pp. 1-62, 1999.
Gears—General Gearing Arrangements, Design Aerospace LLC, www.daerospace.com/mechanicalsystems/gearsgen.php, 2010, p. 1-11.

(56) References Cited

OTHER PUBLICATIONS

Kapelevich et al, Thermotech Company, Introduction to Direct Gear Design, p. 1-15.

Anderson et al, Efficiency of Nonstandard and High Contact Ratio Involute Spur Gears, NASA Technical Memorandum 83725, USAAVSCOM Technical Report 84-C-9, p. 1-35, Oct. 1984.

Mauer, L., The New Powerful Gearwheel Module, Intec GmbH Wessling, Simpack Usermeeting 2006, Baden-Baden, Mar. 21-22, 2006.

Gears, Gears.Doc., Fairfield University, 1073 North Benson Road, Fairfield, Connecticut 06824, 2005, ME312.

Epi Inc., Gear Design—Geometry, Power Ratings, Dynamic Loads, Fatigue, www.epi-eng.com, Nov. 28, 2012, p. 1-5.

* cited by examiner

TORQUE SHARING DRIVE AND TORQUE SHARING PROCESS

FIELD OF THE INVENTION

This invention is in the field of torque sharing drives.

BACKGROUND OF THE INVENTION

Oil rig platforms and the like are well known in the art. These platforms are commonly used during construction of the oil rig and to support workers and equipment at desired elevations. Platforms are necessarily moved upward and downward and these platforms are known as elevating platform assemblies. It is necessary to lift and lower large loads on oil rig platforms and the like. It is necessary to quickly change the elevation of workers and equipment and thus, elevating platform assemblies are advantageous. Accordingly, jacking drives are securely attached to the platform along with a motor to power the jacking drives thus raising and lowering the platform to the desired elevation.

United States Patent Publication No. US 2007/0295136 A1 states, in the abstract: "[a]n anti-backlash system comprising a single drive pinion and motor is disclosed. In an exemplary embodiment, the single drive pinion is situated between two idler gears and is allowed to move in the radial direction relative to the bull gear. A preload force provides for the substantial absence of backlash at low torque loads. The pinion moves to the center point between the two idler gears and balances the torque during high torque loads. The present anti-backlash system is well suited for use in drive and positioning systems that are subject to variable and reversing loads, such as those experienced by radio telescopes in variable wind conditions."

European Patent EP 1 128 974 B1 states, in claim 1, thereof: "[t]he invention relates to a portal drive for a portal axle featuring a drive pinion (1), which is axially supported via two bilaterally arranged axial bearings (4, 5), with the drive pinion driving an output pinion (3) via intermediate gears (2), with which it meshes, characterized in that each of the two axial bearings (4, 5) is pre loaded in axial direction by a spring element (7) so that the drive pinion (1) is floating mounted within the kinetic range of the spring elements (7)."

U.S. Pat. No. 5,595,251, states, in the abstract: "[m]ethods and apparatus are provided for a torque driver including a displaceable gear to limit torque transfer to a fastener at a precisely controlled torque limit. A biasing assembly biases a first gear into engagement with a second gear for torque transfer between the first and second gear. The biasing assembly includes a pressurized cylinder controlled at a constant pressure that corresponds to a torque limit. A calibrated gage and valve is used to set the desired torque limit. One or more coiled output linkages connect the first gear with the fastener adaptor which may be a socket for a nut. A gear tooth profile provides a separation force that overcomes the bias to limit torque at the desired torque limit. Multiple fasteners may be rotated simultaneously to a desired torque limit if additional output spur gears are provided. The torque limit is adjustable and may be different for fasteners within the same fastener configuration."

Imperfections may occur in the teeth of the rack and the teeth of the pinion which drives the rack. Imperfections may occur in the assembly of the torque sharing drive. Imperfections may occur in the alignment and mounting of the torque sharing drive. Imperfections include dimensional variations and inaccuracies. The dimensional variations may affect: tooth surfaces including flank surfaces, circular tooth thicknesses, circular pitch lengths, and tooth spaces. Inaccuracies include gear tooth spacing or index variation between teeth. Additionally, there may also be inaccuracies in the torque sharing drive assembly mounting and spacing between components thereof.

Individual quality level attributes include the following: for the pinion, lead variation, involute variation, gear tooth spacing/pitch variation. In addition, there are various composite variations, which represent a combination of these individual variations, and more closely represent what actual pinion teeth would present to its mating rack. The rack will have similar variations inherent to its manufacture and quality level. In addition to these dimensional variations inherent in each individual part (pinion and rack), there are mounting and alignment variations inherent in the structure that the rack and pinion (torque sharing drive) mount to. The combined effect of these variations (individual, composite and mounting) can be significant. These variations impact operation of the rack and pinion and affect smooth, completely consistent and conjugate action of the rack and pinion. This is normal and expected for any rack and pinion design. Additionally, backlash is the amount of clearance between the rack and pinion tooth flanks. The amount of clearance necessary depends on alignment accuracy between the rack and the pinion. Dimensional variations/inaccuracies in the teeth of the rack may occur. Pitch deviation is the difference between the theoretical rack length and its actual length and depends on the quality of the rack. Tooth quality depends on the accuracy of tooth flanks and faces. This list is set forth by way of example only and is not exhaustive or complete.

SUMMARY OF THE INVENTION

The term "imperfection" is used herein and generally includes "dimensional variations" and "inaccuracies". The terms "dimensional variations" and "inaccuracies" are generally synonymously.

A torque sharing drive and process for sharing torque accommodates tooth inaccuracies on the rack, first and second rack driving outer pinions, main driving pinion and first and second gears. The first and second rack driving outer pinions are referred to later herein as just the first outer pinion and the second outer pinion. The main driving pinion mates with first and second gears. The main driving pinion is radially movable in response to gear separation forces in a vertical direction only along the line between the centers of the main driving pinion, the first gear and the second gear. First and second outer pinions that drive the rack are rotatable with the first and second gears, and as the main driving pinion moves radially toward the first or second gear in response to gear separation forces, the first or second gear is angularly and rotationally advanced with respect to the other gear accommodating inaccuracies in the teeth of the rack and the rack driving outer pinions. Mounting variations of the first and second gears may also occur. Alternatively, when gear separation forces are balanced, the driving pinion resides approximately equidistantly intermediate the first and second gear and the first and second rack driving outer pinions are approximately in phase rotationally.

As used herein, the word "intermediate" means "between". For instance, the driving pinion is always intermediate the first and second gears, however it is not always positioned equidistantly intermediate or equidistantly between the first and second gears or centered between the first and second gears. When the driving pinion is equidistantly intermediate or equidistantly between the first and second gears, this means that it is applying torque equally to the first and second gears and to the first and second outer pinions. When the driving pinion is equidistantly intermediate or equidistantly between the first and second gears, it is centered between the first and second gears. As used herein the term "equidistantly intermediate" does not mean that driving pinion 104 is precisely centered between the centers of the first and second gears as there may be tolerance buildups that prevent a perfectly (mathematically) centered driving pinion.

As used herein the terms "equidistantly intermediate" mean, with respect to the driving pinion, substantially centered between the first and second gears. However, the driving pinion is capable of moving vertically upwardly and vertically downwardly and it then resides intermediate the first and second gears or between the first and second gears but it does not reside equidistantly intermediate or equidistantly between the first and second gears or centered between the gears. Further, the term "home position" is used herein to describe the position of the driving pinion when it is equidistantly intermediate or equidistantly between the first and second gear or centered between the first and second gears.

As used herein the terms "torque sharing drive" are synonymous with the terms "torque load sharing device or apparatus." As used herein the terms "torque sharing drive" are synonymous with the terms "load sharing drive." Further, as used herein the terms "shared torque process" are synonymous with the words "shared load process."

More specifically, the torque sharing drive comprises a driving pinion, a first gear and a second gear. Naturally the driving pinion includes teeth, the first gear includes teeth and the second gear includes teeth. Involute teeth are illustrated in the examples disclosed herein and involute teeth are preferred for all of the pinions, gears and racks. However, this invention specifically contemplates use of other tooth profiles such as cycloidal profiles.

The driving pinion includes a center of rotation, the first gear includes a center of rotation and the second gear includes a center of rotation. The centers of rotation are referred to hereinafter as simply the centers. The centers reside along a line and the center to center distance of the first and second gear is fixed. The driving pinion resides intermediate the first gear and the second gear. Teeth of the driving pinion mesh with the teeth of the first gear and the teeth of the second gear. The driving pinion and the first gear generate a first separation force therebetween which is proportional to torque applied to the first gear by the driving pinion. The driving pinion and the second gear generate a second separation force therebetween which is proportional to torque applied to the second gear by the driving pinion.

The first gear may include a first shaft concentrically located with the center of the first gear. The first gear may be affixed to the first shaft or it may be integral therewith. The second gear includes a second shaft concentrically located with the center of the second gear. The second gear may be affixed to the second shaft or it may be integral therewith.

The rack includes teeth and a portion or portions of the teeth may include imperfections such as inaccuracies/dimensional variations. The first shaft includes a first outer pinion affixed thereto and it is rotatable with the first gear. The first outer pinion may be integral with the shaft. The first outer pinion includes teeth which, when properly positioned, engage a first portion of the teeth of the rack. The second shaft includes a second outer pinion affixed thereto and it is rotatable with the second gear. The second outer pinion may be integral with the shaft. The second outer pinion includes teeth which, when properly positioned, engage a second portion of the teeth of the rack.

The driving pinion is radially movable in response to the first and second separation forces along the line between the centers of the driving pinion, the first gear and the second gear. When the separation force between the driving pinion and the first gear is larger than the separation force between the driving pinion and the second gear, the driving pinion moves radially toward the second gear and the second gear and the second outer pinion are angularly and rotationally advanced with respect to the first gear and the first outer pinion. Alternatively, when the separation force between the driving pinion and the second gear is larger than the separation force between the driving pinion and the first gear, the driving pinion moves radially toward the first gear and the first gear and the first outer pinion are angularly and rotationally advanced with respect to the second gear and the second outer pinion. And, alternatively, when the separation force between the driving pinion and the first gear equals the separation force between the driving pinion and the second gear, the driving pinion resides equidistantly intermediate the first and second gear, the first gear and the first outer pinion and the second gear and the second outer pinion are approximately in phase.

The second gear and the second outer pinion are angularly and rotationally advanced with respect to the first gear and the first outer pinion when the teeth of the second outer pinion do not engage the second portion of teeth of the rack. This advancement continues until the second outer pinion engages the teeth of the rack. Alternatively, the first gear and the first outer pinion are angularly and rotationally advanced with respect to the second gear and the second outer pinion when the teeth of the first outer pinion do not engage the first portion of the teeth of the rack. This advancement continues until the first outer pinion engages the teeth of the rack. Alternatively, the teeth of the first outer pinion engage the first portion of the teeth of the rack and the teeth of the second outer pinion engages the second portion of the teeth of the rack when the separation force between the driving pinion and the first gear substantially equals the separation force between the driving pinion and the second gear.

It is an object of the present invention to provide a torque sharing drive, which accommodates dimensional variations inherent in each individual part (pinion and rack), and also accommodates mounting and alignment variations inherent in the structure that the rack and pinion (torque sharing drive) mount to.

It is an object of the present invention to provide a main drive motor and main planetary gearbox, at the output of this gearbox, there is a main drive pinion flexibly attached to the output of the gearbox so that the drive pinion can move back and forth.

It is an object of the present invention to provide load sharing achieved by allowing the drive pinion that drives first and second mating gears to float such that the drive pinion seeks equal loading with the first and second mating gears.

It is an object of the present invention to provide a flexible spline connection to a planetary gearbox/driver to allow controlled floating movement of the drive pinion to take place.

It is an object of the present invention to provide sufficient backlash in the gear meshes to allow for sufficient floating of the drive pinion in order to accommodate rack gear tooth spacing variations, spacing and alignment variations of the first and second mating gears, spacing and alignment variations of the first and second outer pinions and other variations in the torque sharing drive system.

It is an object of the present invention to provide load sharing such that the first and second outer pinions share the load equally or approximately equally.

It is an object of the present invention to provide a torque sharing drive which angularly and rotationally advances a first outer pinion with respect to a second outer pinion wherein the first and second pinions drive a rack.

It is an object of the present invention to provide a torque sharing drive which angularly and rotationally advances a first gear with respect to a second gear wherein the first and second gears drive first and second outer pinions, respectively.

It is an object of the present invention to provide a torque sharing drive which angularly and rotationally advances a second outer pinion with respect to a first outer pinion wherein the first and second outer pinions drive a rack.

It is an object of the present invention to provide a torque sharing drive which angularly and rotationally advances a second gear with respect to a first gear wherein the first and second gears drive first and second outer pinions, respectively.

It is an object of the present invention to provide a torque sharing drive.

It is an object of the present invention to provide a torque sharing drive which employs a driving pinion movable, radially and bidirectionally, along a line.

It is an object of the present invention to provide a torque sharing drive which employs a driving pinion movable, radially and bidirectionally, in a vertical direction only or in a horizontal direction only.

It is an object of the present invention to provide a torque sharing device wherein the driving pinion shaft includes a crowned external spline mating with an internal spline.

It is an object of the present invention to provide a torque sharing device wherein a coupling having an internal or external crowned spline drives an external or internal spline located on a shaft of the driving pinion.

It is an object of the present invention to provide a torque sharing drive wherein the driving pinion is driven by a swivel connection.

It is an object of the present invention to provide a torque sharing drive which accommodates imperfections and/or inaccuracies and/or dimensional variations in the gear train, the gear train includes a driving pinion, a first driven gear, a second driven gear, a first outer pinion and a second outer pinion.

It is an object of the present invention to provide a torque sharing device which includes a swivel connection, a driving pinion, a first gear, a second gear, a first outer portion, and a second outer pinion.

It is an object of the present invention to provide a torque sharing device which accommodates imperfections in a rack which include dimensional variations/inaccuracies and a pinion drive wherein there are two outer pinions driving the rack.

It is an object of the present invention to provide two torque sharing devices with one device on one side of the rack and the other device on the other side of the rack.

It is an object of the present invention to provide a torque sharing device to accommodate racks which are stacked or joined together.

It is an object of the present invention to provide a load sharing device having two or more outer pinions which drive a rack.

It is an object of the present invention that torque sharing and load sharing of the drive occurs such that the main drive pinion 104 moves radially, along a line of centers between the first gear and second gear, in relationship to the separation forces thereof.

It is an object of the present invention to accommodate the accumulated rack gear teeth spacing variation from the first rack and pinion meshing location to the second rack and pinion meshing location.

These and other objects will be best understood when reference is made to the drawings and the description of the invention which follows hereinbelow.

BRIEF DESCRIPTION OF THE DRAWINGS

FIG. 1O is an enlarged view of a portion of the second outer pinion and a portion of the rack illustrating the second outer pinion with two successive teeth having profile imperfections which include dimensional variations/inaccuracies.

These drawings will be better understood when reference is made to the description of the invention and claims which follow hereinbelow.

DESCRIPTION OF THE INVENTION

Figure 1:
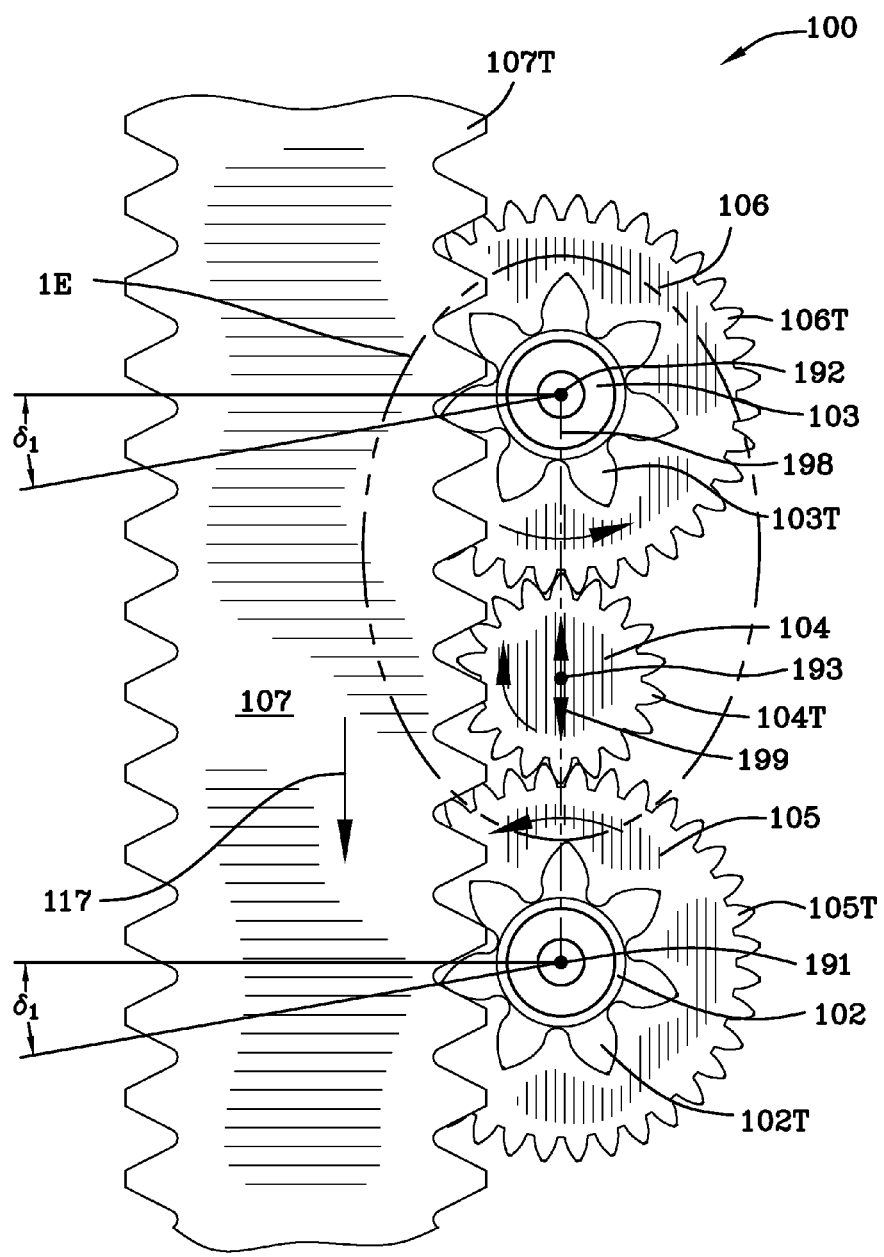
FIG. 1 is a schematic view of the rack and pinion drive illustrating the movable driving pinion residing equidistantly intermediate the first gear and a second gear.

FIG. 1 is a schematic view 100 of the torque sharing drive illustrating the rack 107 and pinion drive 102, 103, and, the movable driving pinion 104 residing equidistantly intermediate the first gear 105 and the second gear 106. Driving pinion 104 is movable, radially, bidirectionally, in the vertical direction when viewing FIGS. 1 and 1A as indicated by arrow 199. Driving pinion 104 includes a shaft 104A having a crowned external spline 104S which engages a torque driver 201 having an internal driving spline 201S. The torque driver 201 may be powered by various devices, for instance, the torque driver 201 may be powered by a planetary gear set. See FIGS. 2 and 8A which illustrate the torque driver 201 and driving spline 201S.

Driving pinion 104 does not have a fixed center and it is movable, radially, in one direction along line 198 as illustrated in FIGS. 1, 1A, 1B, 1C, and 1D. For instance, driving pinion 104 is movable, radially, vertically either upwardly or downwardly along line 198. Arrow 199 in FIG. 1 illustrates possible vertical movement of driving pinion either upwardly or downwardly depending on the load conditions of outer pinion 102, 103. Line 198 is not a physical object, rather it is a centerline superimposed on the drawings. Driving pinion 104 has a movable center 193. First gear 105 has a fixed center 191, second gear 106 has a fixed center 192, and the distance between the centers 191, 192 of first gear 105 and second gear 106 is fixed.

The torque sharing drive and process for sharing torque accommodates tooth inaccuracies on the rack 107 and outer pinions 102, 103. The torque sharing drive and process for sharing torque accommodates mounting and alignment variations of the components of the drive. Driving pinion 104 mates with first and second gears 105, 106. Driving pinion 104 is radially movable in response to gear separation forces in a vertical direction along line 198 between the centers 191, 192, 193 of the driving pinion 104, the first gear 105 and the second gear 106. First and second outer pinions 102, 103 are rotatable with the first and second gears 105, 106, and as the driving pinion 104 moves radially toward the first 105 or second gear 106 in response to gear separation forces, the first 105 or second 106 gear is angularly and rotationally advanced with respect to the other gear accommodating inaccuracies in the teeth 107T of the rack 107 and the teeth 102T, 103T of outer pinions 102, 103. Alternatively, when gear separation forces are balanced, the driving pinion 104 resides approximately equidistantly intermediate the first and second gears 105, 106 and the first and second outer pinions 102, 103 are rotationally in phase or approximately rotationally in phase.

Figure 2:
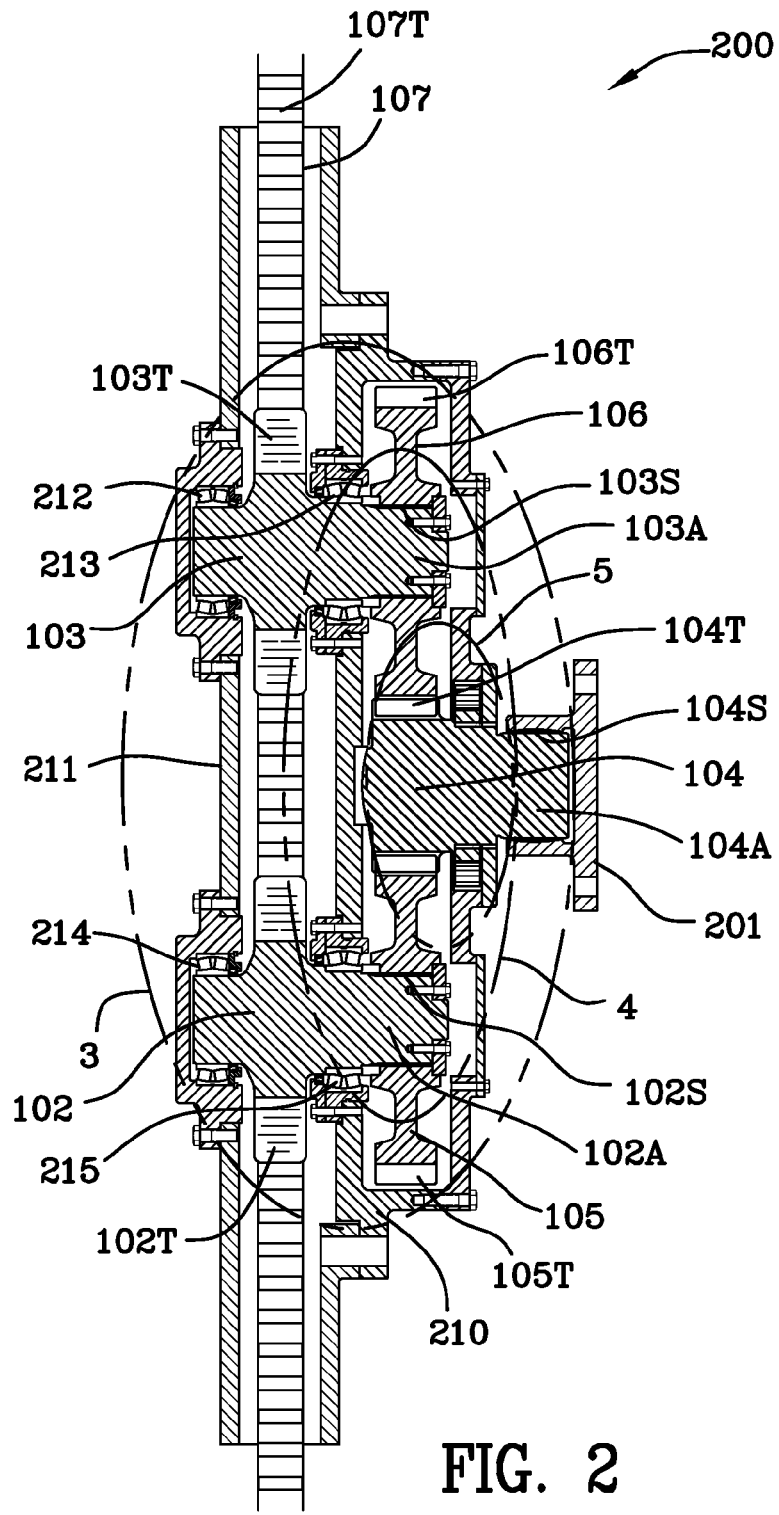
FIG. 2 is a cross-sectional schematic view of the torque sharing drive illustrating the torque driver, the driving pinion, the first driven gear and the first outer pinion, the second driven gear and the second outer pinion, and the rack.

Still referring to FIG. 1, driving pinion 104 is illustrated rotating in the clockwise direction as indicated by arrow 199 on driving pinion 104. Driving pinion teeth 104T drive teeth 105T, 106T of first and second gears 105, 106. The driving pinion gear teeth 104T are crowned, and the first and second gear teeth 105T, 106T are also crowned. First and second gears 105, 106 and first and second outer pinions 102, 103 are illustrated rotating in the counterclockwise direction by the unnumbered arrows placed thereon. The first outer pinion 102 is integral with shaft 102A and the second outer pinion 103 is integral with shaft 103A as illustrated in FIG. 2. Gear 105 is splined 102S to shaft 102A and gear 106 is splined 103S to shaft 103A. Gear 105 rotates with first outer pinion 102 and gear 106 rotates with second outer pinion 103. See FIG. 2 for an illustration of shafts 102A, 103A.

The driving pinion 104, first gear 105, and second gear 106 may be carburized and hardened steel. Output pinions 102, 103 may be through hardened steel at approximately Rc 36 hardness. The driving pinion and first and second gears are enclosed in a sealed housing as illustrated in FIG. 2, and are lubricated with oil and are not subjected to the harsh outside environment. The output pinions 102, 103 will be subjected to the outside environment.

Figure 6:
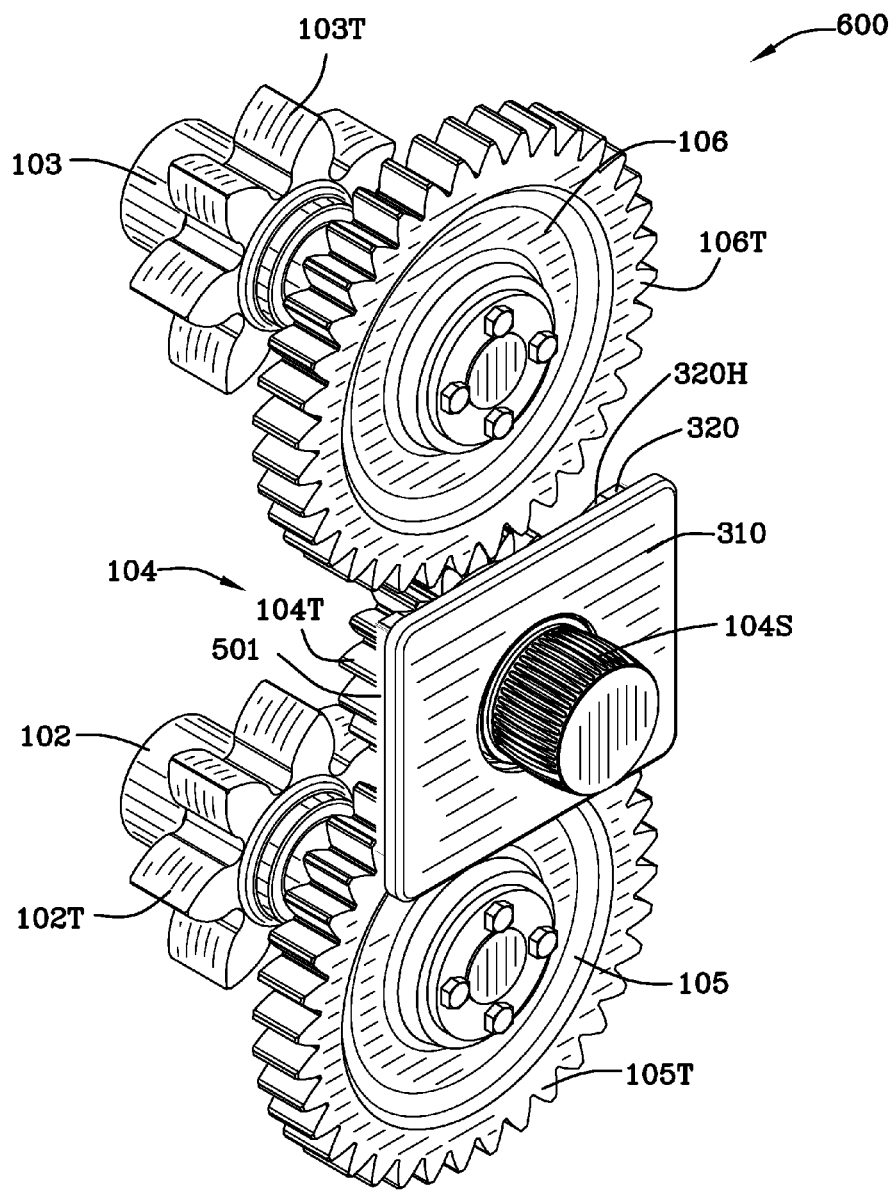
FIG. 6 is a front schematic perspective view of the driving pinion shifted radially and vertically upwardly, together with a cover, crowned external spline, first gear and second gear.

Still referring to FIG. 1 and further referring to FIG. 6, driving pinion 104, first gear 105 and second gear 106 preferably employ involute gear teeth. In the example illustrated, the driving pinion 104 has 18 teeth and the driven gears 105, 106 have 36 teeth. Nominally, the teeth of driving pinion 104 have a face and flank width of approximately eight inches and are slightly wider than driven gears 105, 106. The teeth of the first and second outer pinions are approximately 6 inches in width and are slightly wider than the rack teeth 107T. Different gear ratios and numbers of teeth may be used and have been set forth herein by way of example only.

Figure 1A:
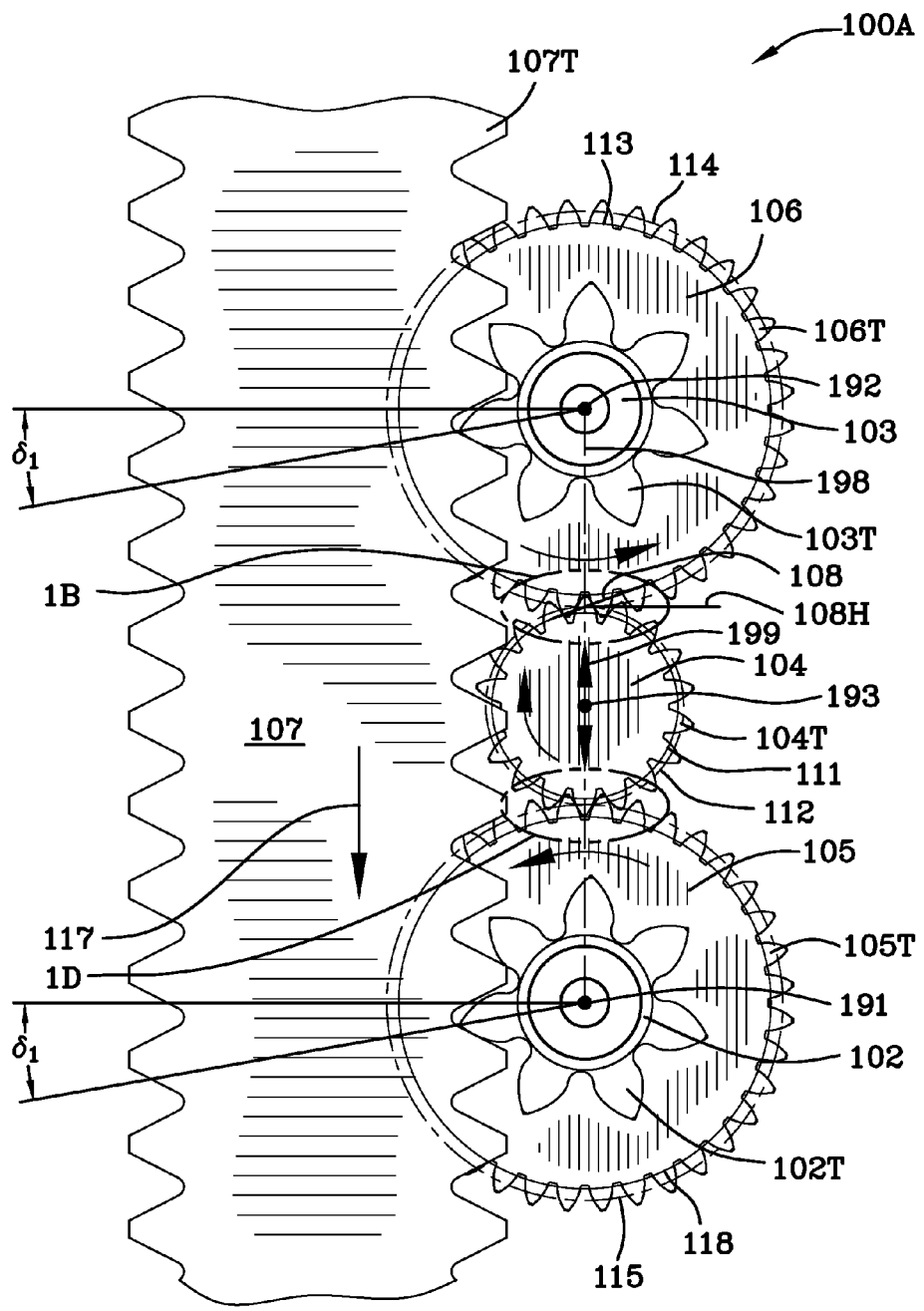
FIG. 1A is a schematic view of the rack and pinion drive similar to FIG. 1 illustrating pitch circles and base circles of the movable driving pinion, first gear and second gear.

Still referring to FIGS. 1 and 1A, outer pinion teeth 102T, 103T are illustrated engaging rack teeth 107T and angle $\delta_1$ illustrates the angular position of outer pinion teeth 102T, 103T with approximately equal load sharing between the outer pinion teeth 102T, 103T and rack teeth 107T. Angle $\delta_1$ is an angle between a horizontal reference and the center of one of the outer pinion teeth 102T, 103T wherein the outer pinion teeth 102T, 103T are illustrated as being rotationally in phase. In other words, the same angle, $\delta_1$, exists in regard to both outer pinions 102, 103. FIG. 1E is an enlargement of a portion 100 of FIG. 1 illustrating the angle $\delta_1$, the initial angular position of one of the teeth 103T of the second outer pinion 103 with respect to a horizontal line with approximately equal load sharing. FIG. 1F is an enlargement 100F of a portion of FIG. 1E illustrating the angle $\delta_1$.

Driving pinion 104 is positioned equidistantly intermediate gears 105, 106 and driving pinion 104 in FIGS. 1 and 1A is applying torque equally or approximately equally to gears 105, 106 and, therefore, driving pinion 104 is applying torque equally or approximately equally to outer pinions 102, 103 which raises the torque sharing drive upwardly in a direction opposite to arrow 117.

Reference numeral 117 indicates the relative direction of the rack 107. Rack 107, in a platform jacking drive application, while jacking, is stationary and the jacking drive (also known as a torque sharing drive) is affixed to the platform and the jacking drive and the platform move vertically relative to the rack 107. Counterclockwise rotation of outer pinion 102, 103 raise the platform which is not shown in the drawings. The platform is attached to the frame of the torque sharing device.

Figure 3:
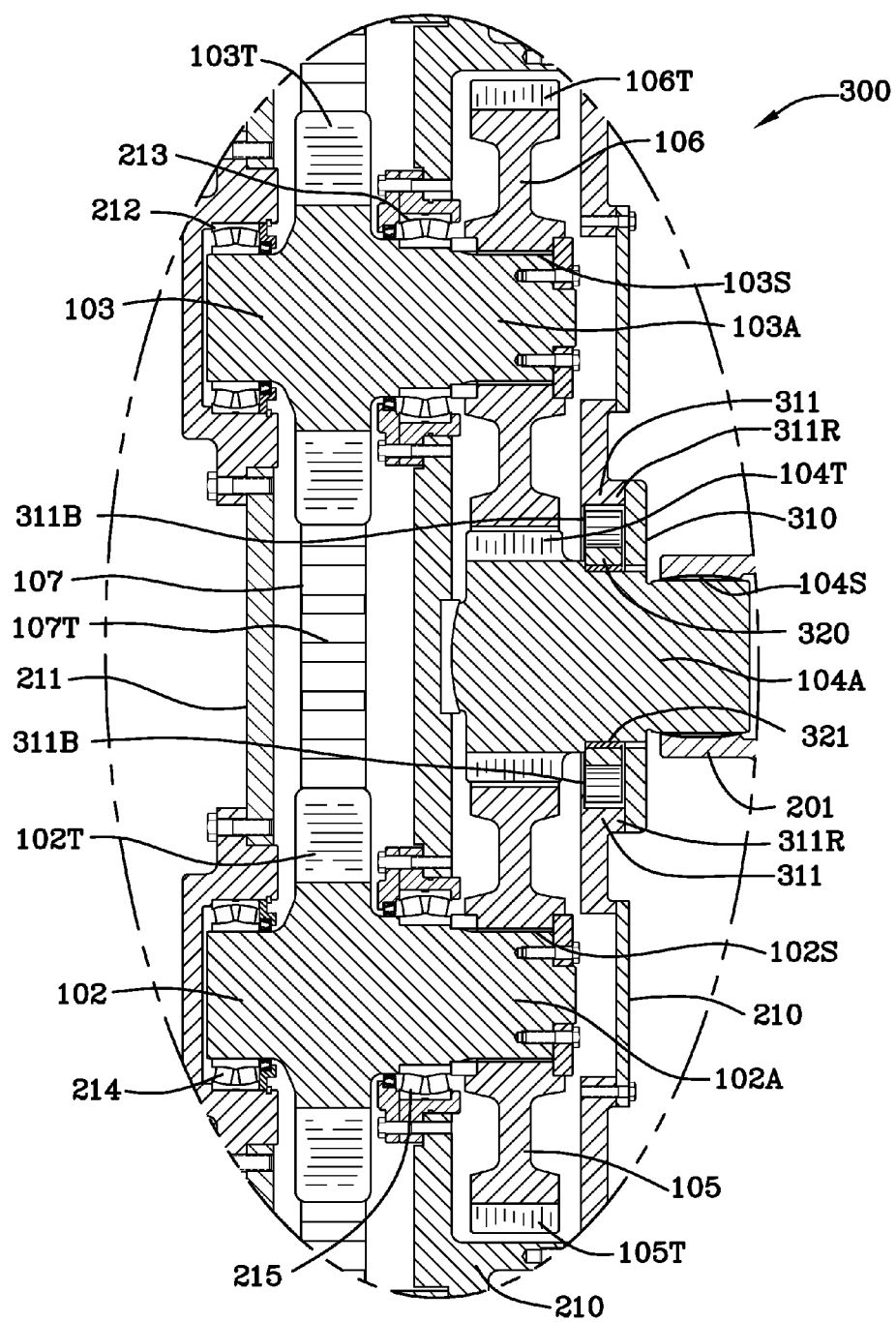
FIG. 3 is an enlargement of a portion of FIG. 2.
Figure 4:
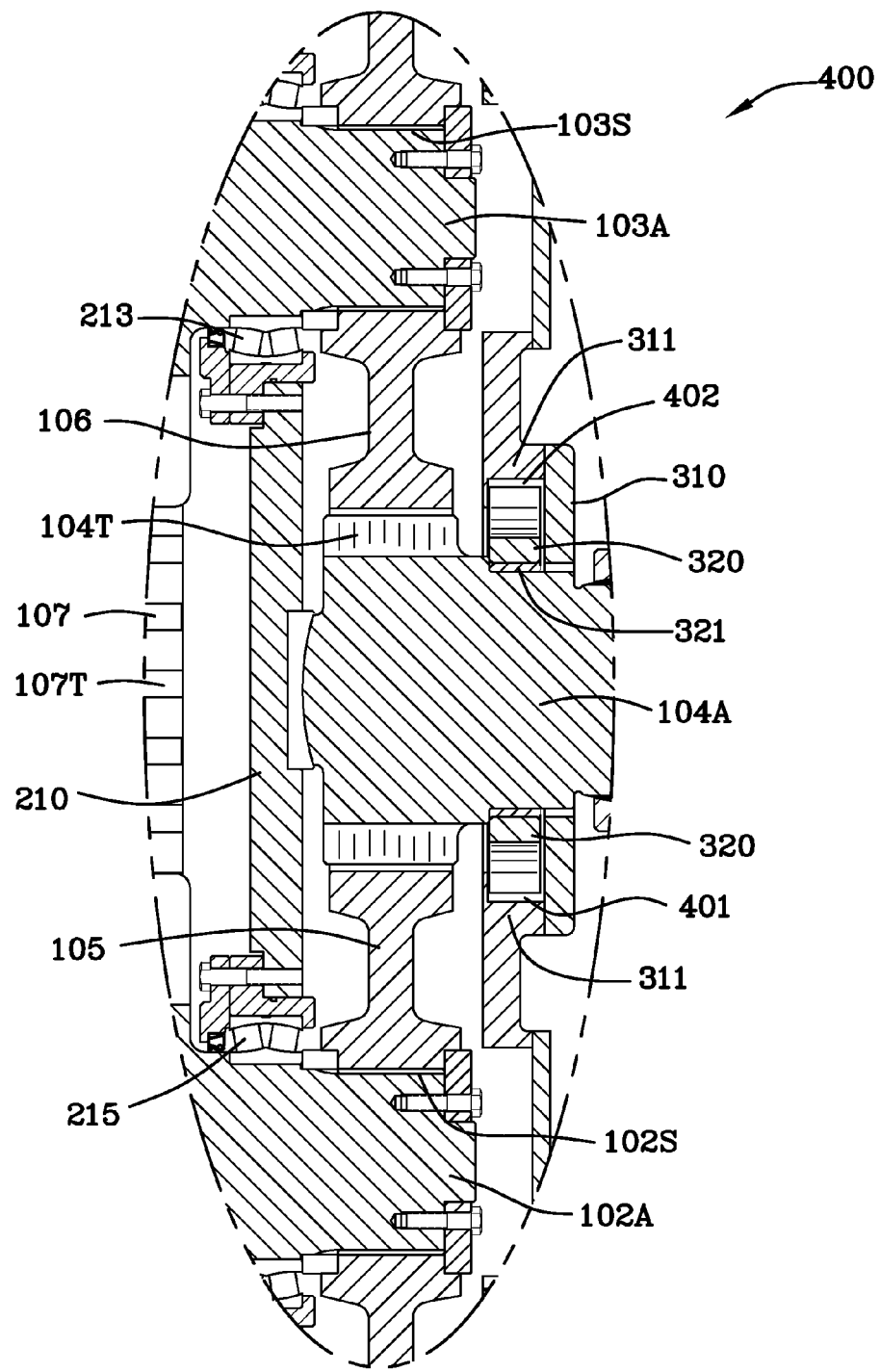
FIG. 4 is another enlargement of a portion of FIG. 2.
Figure 5:
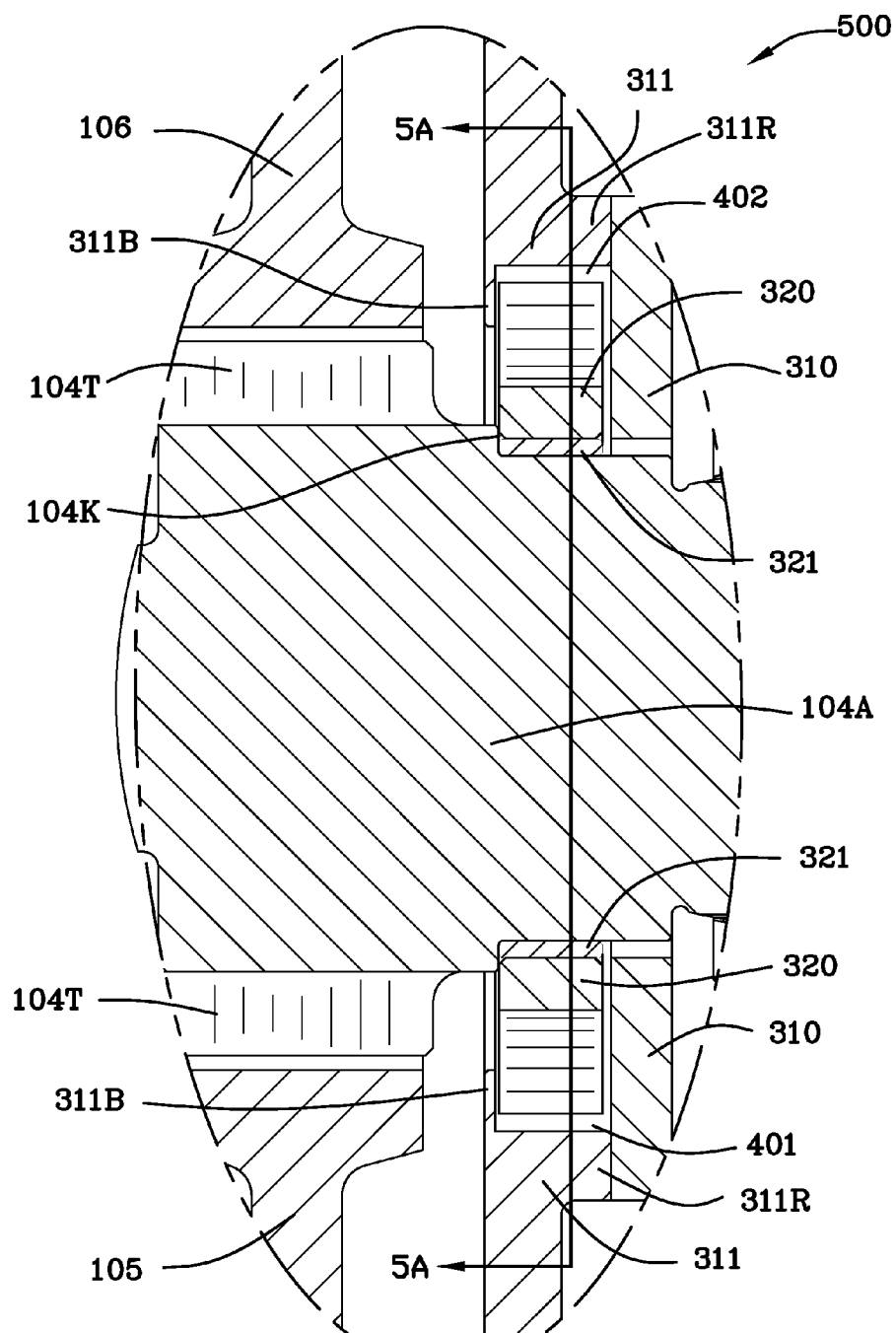
FIG. 5 is another enlargement of a portion of FIG. 2.
Figure 5A:
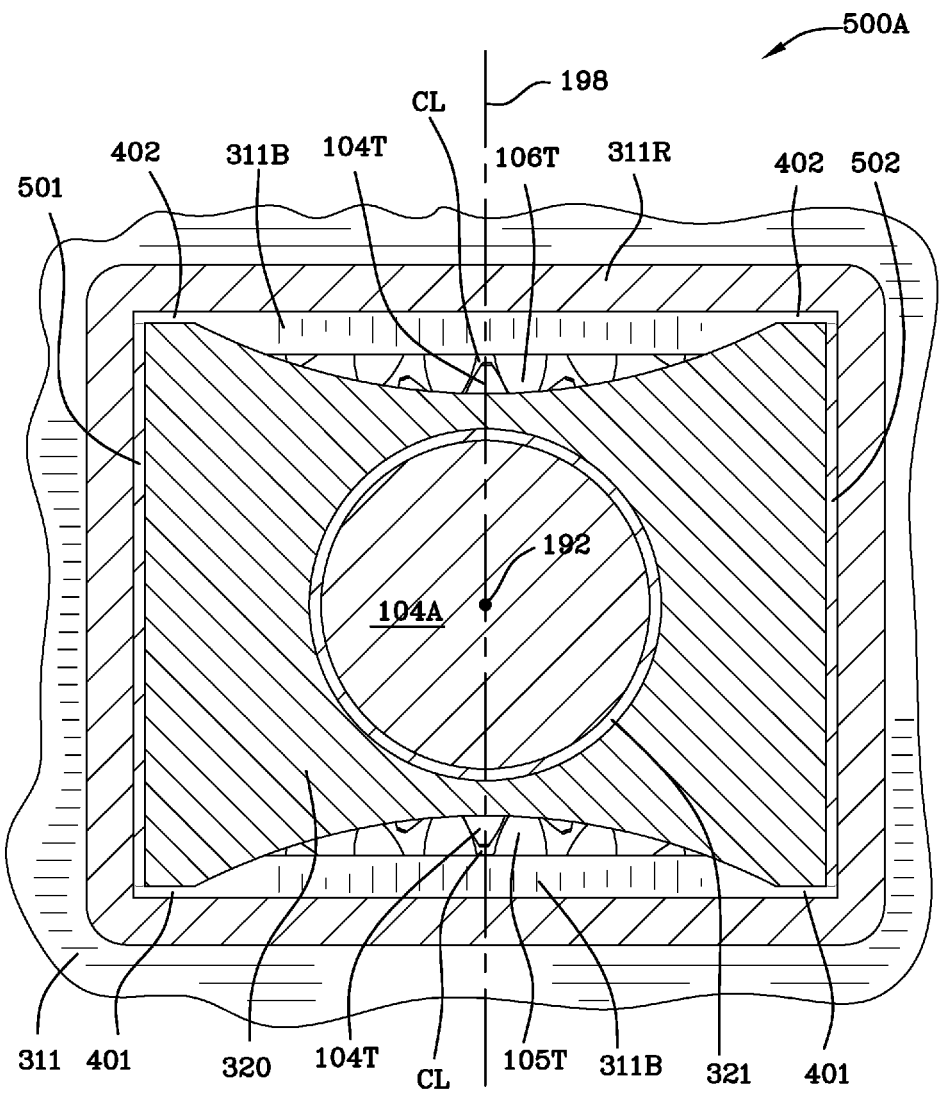
FIG. 5A is a cross-sectional view along the lines 5A-5A of FIG. 5.

FIG. 2 is a cross-sectional schematic view 200 of the torque sharing drive illustrating the torque driver 201, the main driving pinion 104, the first driven gear 105 (first gear 105) and the first outer pinion 102, the second driven gear 106 (second gear 106) and the second outer pinion 103, and the rack 107. FIG. 2 represents the condition or situation where the driving pinion 104 is positioned equidistantly intermediate first gear 105 and second gear 106. In other words, driving pinion 104 is in its home position, as illustrated in FIGS. 2, 3, 4, 5 and 5A. As used herein the term "equidistantly intermediate" does not mean that driving pinion 104 is precisely centered between the centers 191, 192 of the first and second gears as there may be tolerance buildups that prevent a perfectly (mathematically) centered driving pinion. As used herein the terms "equidistantly intermediate" mean, with respect to driving pinion 104, substantially centered between the first and second gears. The frame 211, 311 and additional unnumbered frame elements are illustrated in FIGS. 2 and 3 and these numbered and unnumbered frame elements support the two pinion drive. The frame 211, 311 and unnumbered frame elements illustrated in FIGS. 2 and 3 are affixed to a platform such as an oil rig platform. FIG. 3 is an enlarged view 300 of a portion of FIG. 2 which shows more detail. FIG. 4 is another enlarged view 400 of a portion of FIG. 2. FIG. 5 is another enlarged view 500 of a portion of FIG. 2. FIG. 5A is a cross-sectional view 500A along the lines 5A-5A of FIG. 5.

Referring to FIG. 2, bearings 214, 215 support shaft 102A and bearings 212, 213 support shaft 103A. Referring to FIGS. 2, 3, 4, 5, and 5A, driving pinion shaft 104A resides within guide 320 and within bushing 321. Bushing 321 is affixed to the guide 320 and is stationary with respect to rotating driving pinion shaft 104A. Rotating driving pinion shaft 104A resides within bushing 321 and rotates relative thereto. Bushing 321 has sufficient lubricity to permit driving pinion shaft 104A to rotate relative thereto. Guide 320 is permitted to move vertically, upwardly or downwardly, within housing 311, 311B, 311R and cover 310. FIG. 5 illustrates housing 311 which includes a raised portion 311R and a restraining back portion 311B. FIG. 5 further illustrates shoulder 104K which also restrains the movement of guide 320.

Still referring to FIG. 5, shaft 104A of driving pinion 104 moves radially, depending on the loads on first gear 105 and second gear 106. Additionally, shaft 104A includes a crowned external spline which mates with an internal spline 201S of torque driver 201. The internal spline 201S may have a reciprocally shaped internal crown. Shaft 104A may swivel depending on the loads on first gear 105 and second gear 106. Specifically, as the driving pinion gear moves bidirectionally in the vertical direction, the external spline of the shaft 104A engages the internal spline portion 201S of torque driver 201. Shaft 104A moves angularly with respect to the internal spline portion 201S to allow for the vertical movement of the driving pinion 104 and the driving pinion teeth 104T.

Figure 8:
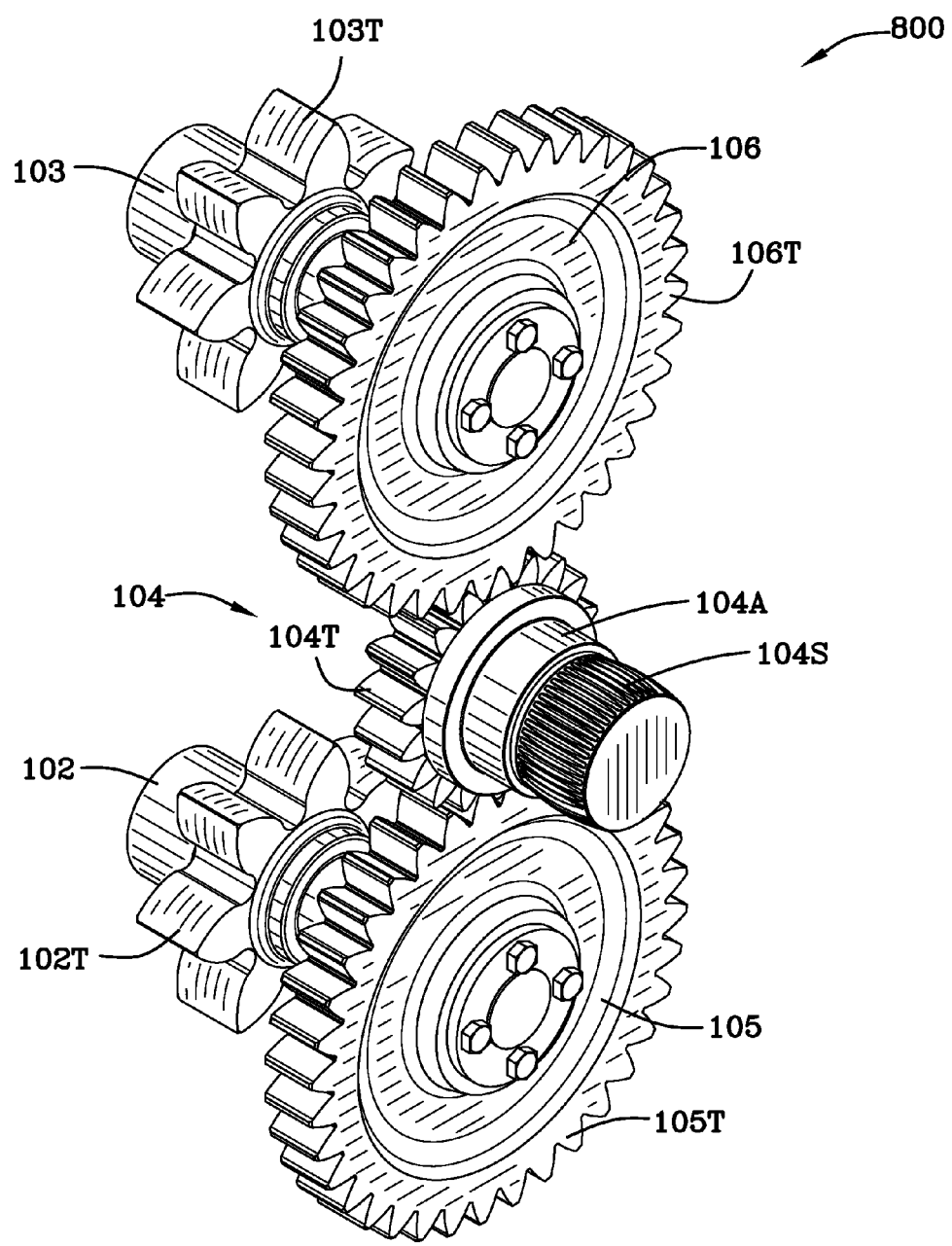
FIG. 8 is a front schematic perspective view of the driving pinion shifted radially and vertically upwardly into deeper meshing engagement with the second gear and less deep meshing engagement with the first gear.
Figure 8A:
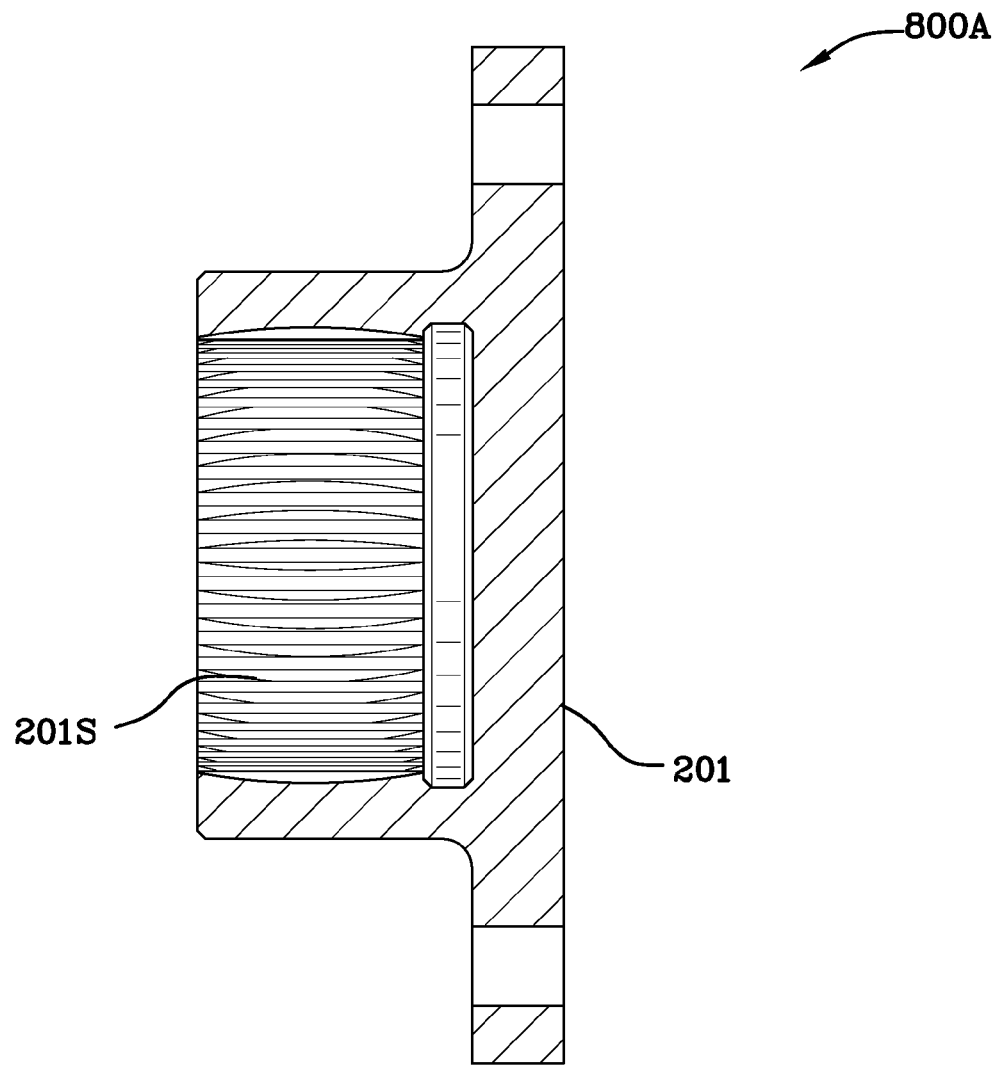
FIG. 8A is a cross-sectional view of the swivel coupling and internal spline.

Referring to FIG. 2 and FIG. 8A, torque driver 201 is illustrated with an internal spline 201S. Driving pinion 104 includes a driving shaft 104A which includes an external crown shaped spline portion 104S which interengages an internal spline portion 201S of torque driver 201. The internal spline portion may optionally be crowned. Other connections between the torque driver and the driving shaft 104A may be used, for instance, without limitation, a swivel connector, a universal joint or other connection may be used.

Referring to FIG. 5A, hour glass-shaped guide 320 is restrained by the frame member 311, the raised portion 311R of the frame member 311, the back portion 311B, and a shoulder 104K on the shaft 104S. FIG. 5A does not show front cover 310, however, FIG. 5 illustrates cover 310. Guide 320 limits the movement of the shaft 104A of the driving pinion 104.

Still referring to FIG. 5A, driving pinion shaft 104A, bushing 321, bushings 501, 502, a portion of teeth 104T of the driving pinion 104, a portion of the teeth of first gear 105, a portion of the teeth of second gear 106, and vertical gaps 401, 402 are illustrated housed within raised portion 311R of housing 311, housing 311, and back portion 310B of housing 311. FIG. 5A represents the home position of the driving pinion 104A with respect to the first gear 105 and second gear 106.

Figure 7:
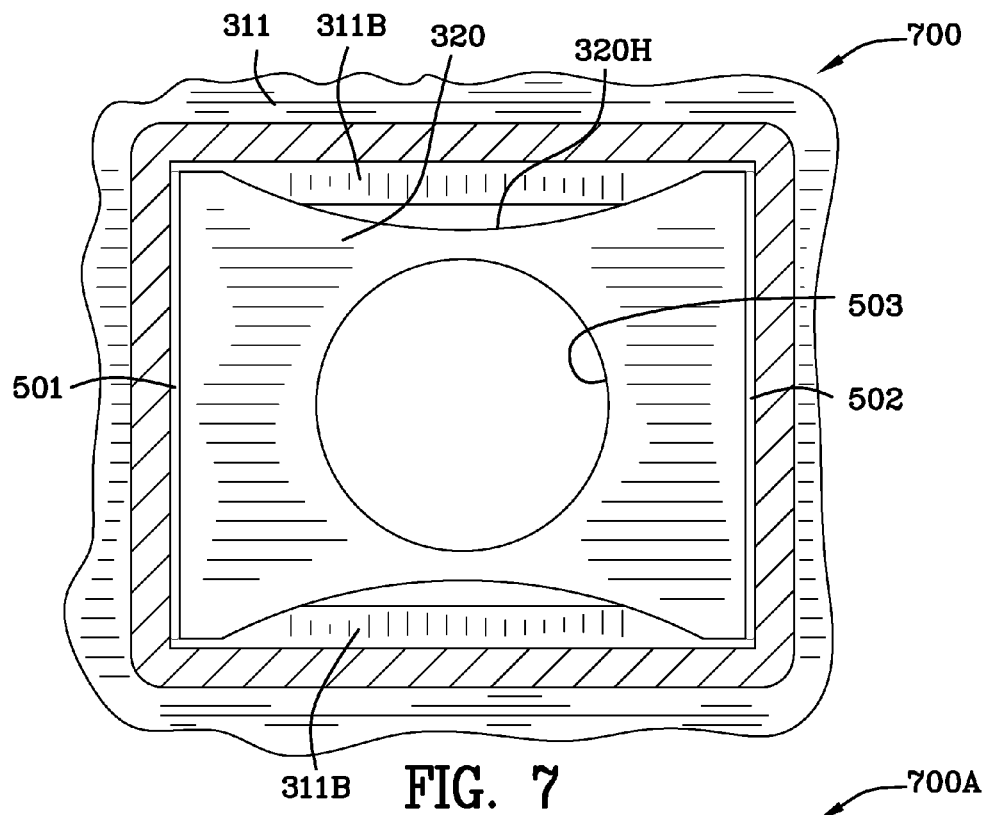
FIG. 7 is a front schematic view of the shaft guide within the housing without the cover illustrating the movement of the guide within the housing.
Figure 7A:
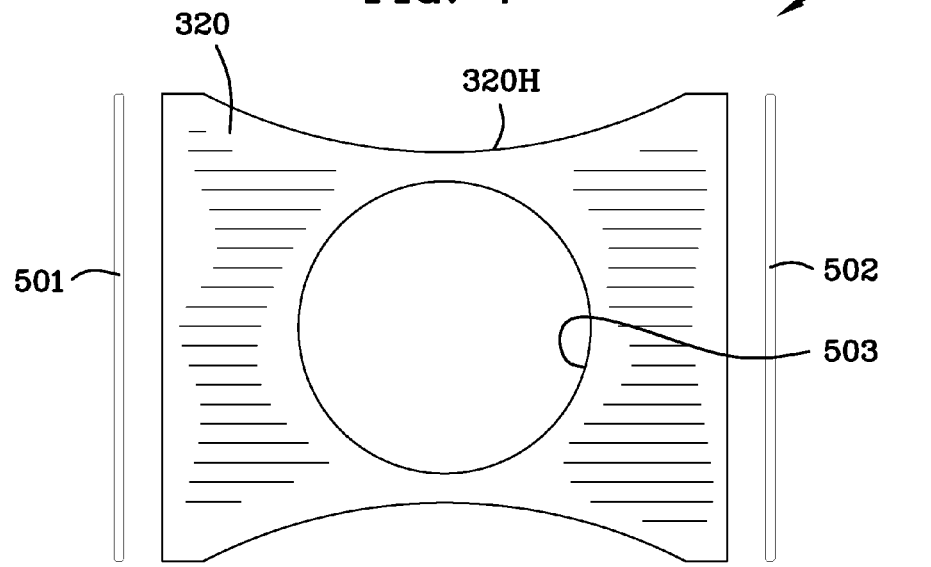
FIG. 7A is a front schematic view of guide and the bushings.

FIG. 7 is a front schematic view 700 of the shaft guide 320 within housing without the cover illustrating the movement of the guide within the housing. FIG. 7A is a front schematic view 700A of guide 320 and bushings 501, 502.

Figure 5B:
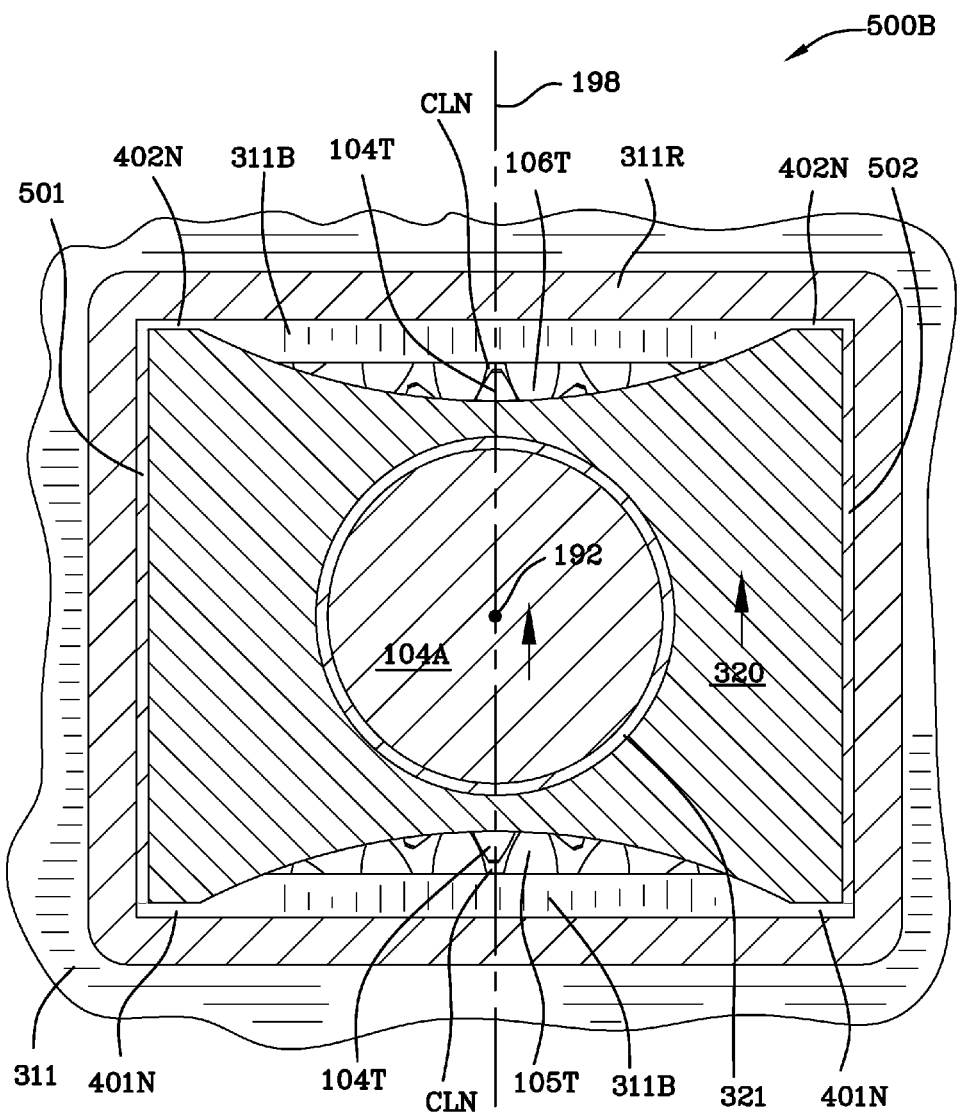
FIG. 5B is a cross-sectional view similar to FIG. 5A illustrating the shaft guide and driving pinion.

FIG. 5B is a cross-sectional view 500B similar to FIG. 5A illustrating the shaft guide 320 and driving pinion 104A raised due to the upward movement of the shaft 104S resulting in an increased gap 401N and a decreased gap 402N. FIG. 5B illustrates the driving pinion 104 meshed deeper into engagement with second gear 106 and corresponds to the views of the driving pinion 104 illustrated in FIGS. 1G, 1H, 1I, 1J, and 1K. Still referring to FIG. 5B, an unnumbered vertically upward arrow on guide 320 indicates movement of guide 320 in the upward direction. FIG. 5B also illustrates a smaller clearance CLN between teeth 104T of driving pinion 104 and teeth 106T of second gear 106. FIG. 5B also illustrates a larger clearance CLN between teeth 104T of driving pinion 104 and teeth 105T of first gear 105. Side to side movement of guide 320 and shaft 104S is limited by housing 311, and bushings 501, 502.

Figure 6A:
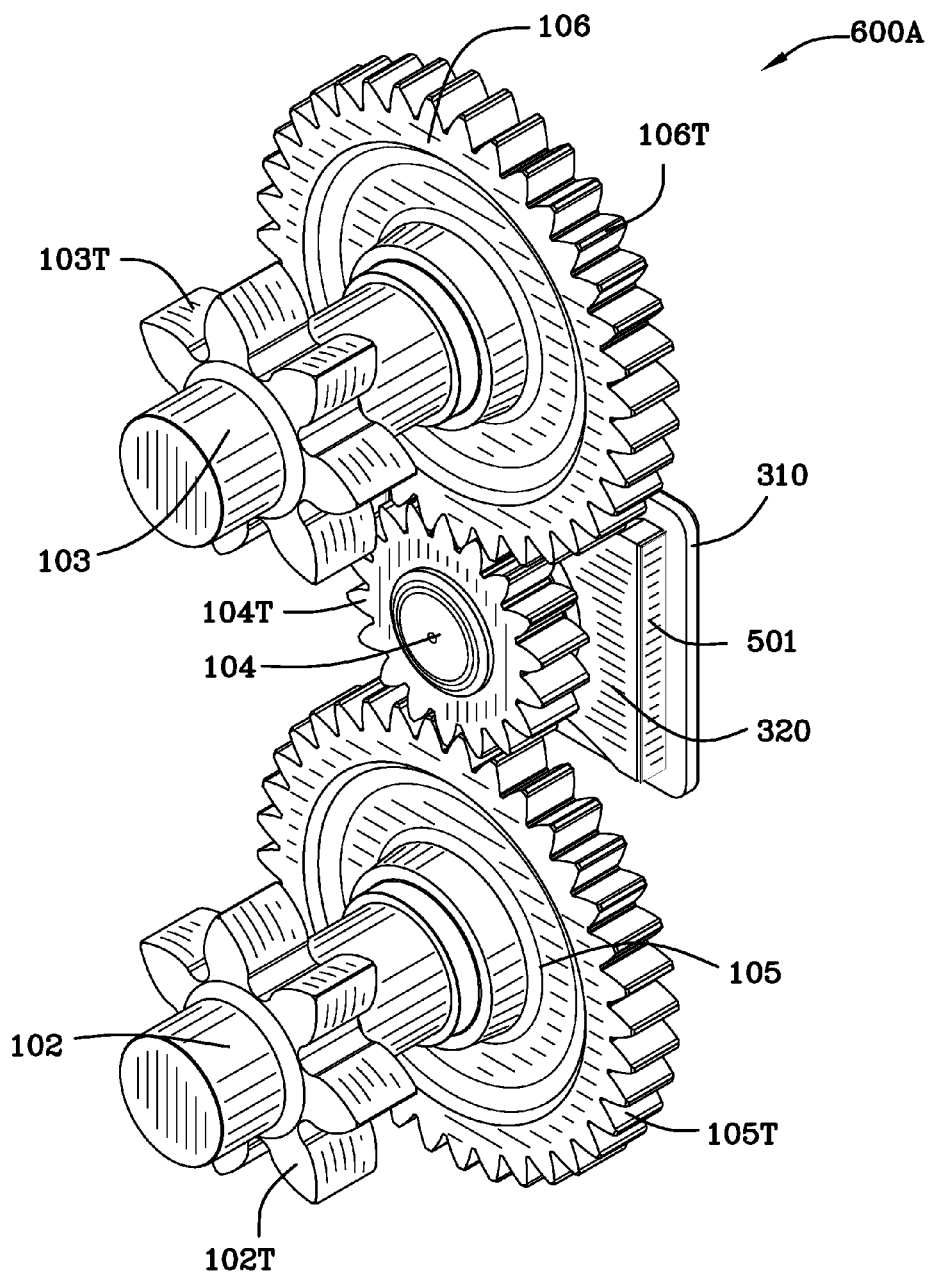
FIG. 6A is a rear schematic perspective view of the driving pinion shifted radially and vertically upwardly, together with a cover, first gear and second gear.

FIG. 6 is a front schematic perspective view 600 of driving pinion 104 shifted radially and upwardly, cover 310, crowned external spline 104S of the driving pinion 104, first gear 105 and second gear 106. FIG. 6 illustrates the driving pinion moved upwardly meshed deeply in engagement with second gear 106. One of the bushings 501 is illustrated in FIG. 6. Bushing 501 when used in conjunction with driving pinion guide 320 prevents side to side movement (horizontal movement) of the driving pinion 104. FIG. 6 further illustrates driving pinion guide 320 behind cover 310. Cover 310 along with housing 311, raised portion 311R of the housing 311, back portion 311B of housing, and shoulder 104K on driving pinion shaft 104A restrain guide 320. FIG. 6A is a rear schematic perspective view 600A of driving pinion 104 shifted radially and upwardly, cover 310, first gear 105 and second gear 106.

FIG. 8 is a front schematic perspective view 800 of the driving pinion 104 shifted radially and vertically upwardly into deeper meshing engagement with second gear 106 and in less deep meshing engagement with first gear 105. FIG. 8 illustrates crowned spline 104S, shaft 104A of driving pinion 104, and gear teeth 104T. FIG. 8A is a cross-sectional view 800A of the torque drive 201 and internal spline 201S which meshes with crowned spline 104S of driving pinion 104.

As viewed in FIGS. 1, 1A, 1B, 1C, 1D, and 1E, driving pinion 104 is illustrated in its home position. In the home position, the separation force that exists between driving pinion 104 and first gear 105 is balanced by the separation force between driving pinion 104 and second gear 106. See FIGS. 1C and 1D which illustrate equal and opposite forces $F_S$. FIG. 1A is a schematic view 100A of the rack 107 and outer pinions 102, 103 similar to FIG. 1 illustrating pitch circles and base circles of the movable driving pinion 104, first gear 105 and second gear 106. FIG. 1A illustrates: the pitch circle 112 and the base circle 111 of driving pinion 104; the pitch circle 114 and the base circle 113 of the second gear 106; and, the pitch circle 115 and the base circle 118 of the first gear 105.

Figure 1B:
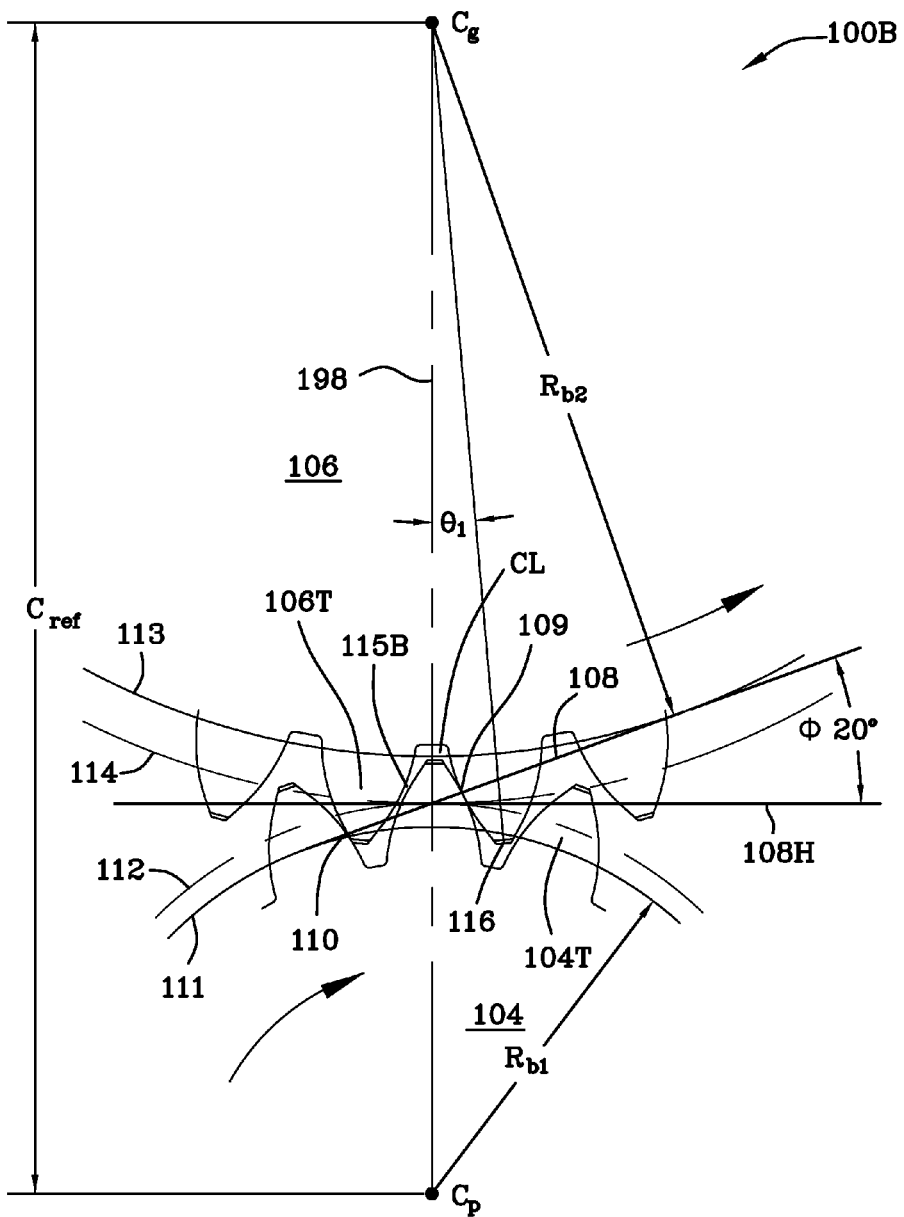
FIG. 1B is a schematic view of a portion of FIG. 1A illustrating the driving pinion and the second gear meshed together with a pressure angle of 20°, a line of action, and pitch and base circles of the driving pinion and the second gear.

FIG. 1B is an enlarged schematic view 100B of a portion of FIG. 1A illustrating driving pinion 104 and second gear 106 meshed together with a pressure angle of 20°, a line of action 108, and pitch and base circles of the driving pinion and the second gear. $C_g$ is the center of gear 106 and $C_p$ is the center of radially and vertically movable driving pinion gear 104. Backlash 115B is illustrated in FIG. 1B and it must be sufficiently large to permit deeper than normal mesh of the driving pinion 104 with first gear 105 and second gear 106. When the torque sharing drive is unbalanced, then the driving pinion 104 is moved upwardly and downwardly along line 198. Specifically, backlash must be sufficient to permit deeper than normal mesh and interengagement of the driving pinion 104 and the first gear 105 and the second gear 106 to enable operation of the gear train with operating pitch diameters that may be substantially different than the theoretical pitch diameters. Without sufficient backlash, teeth of meshing gears may jam. $C_{REF}$ is the distance between the center of the driving pinion 104 precisely intermediate the center of first gear 105 and second gear 106 and the center of the first gear or the second gear.

Figure 1C:
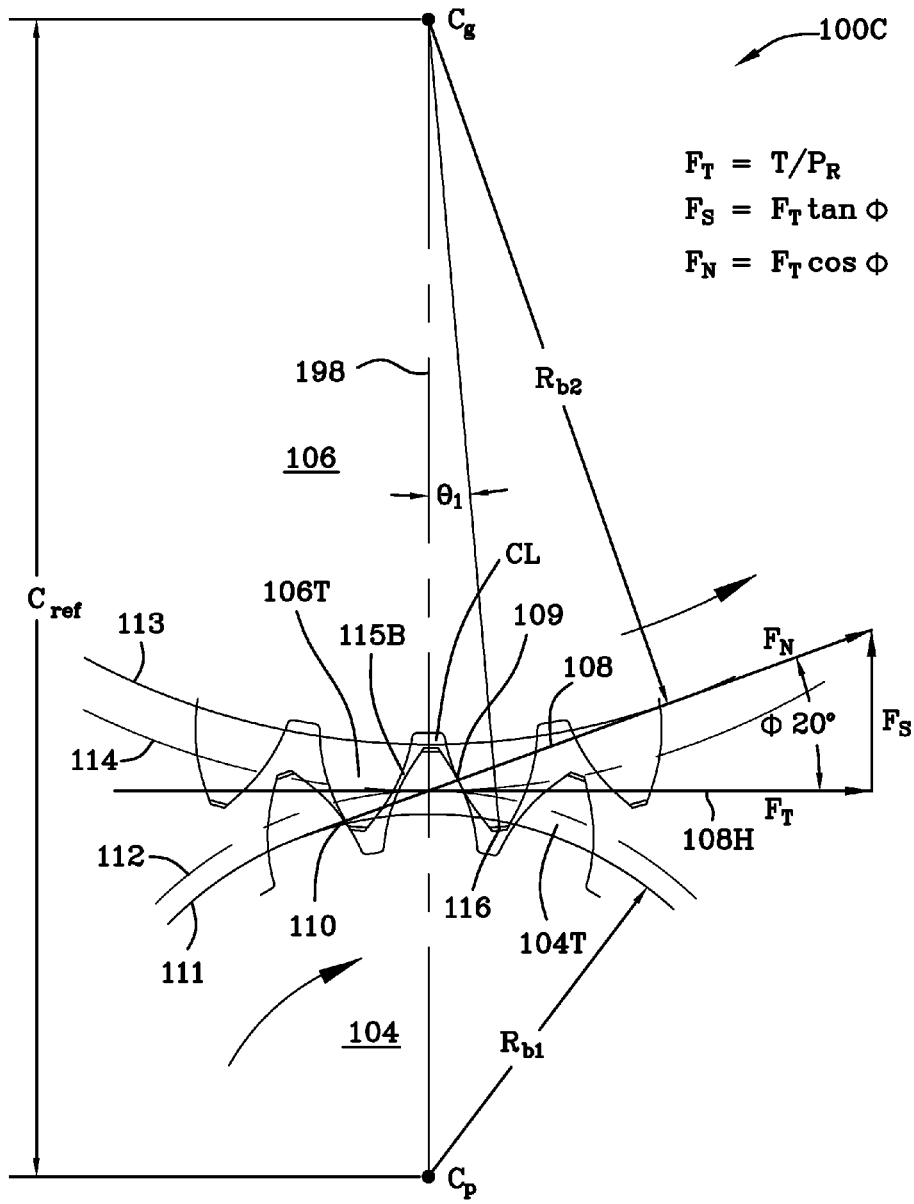
FIG. 1C is a schematic view similar to FIG. 1B together with force vectors, namely, $F_T$ the tangential force along the tangent of the pitch circles of the driving pinion and the second gear, $F_S$ the separation force between the driving pinion and the second gear, and, $F_N$, the normal force along the line of action oriented at the pressure angle.

FIG. 1C is a schematic view 100C similar to FIG. 1B together with force vectors, namely, $F_T$ is the tangential force along the tangent of the pitch circles of driving pinion 104 and second gear 106, $F_S$ is the separation force between driving pinion 104 and second gear 106, and $F_N$ is the normal force along the line of action 108 oriented at the pressure angle, $\phi$. $F_S$ the separation force between driving pinion 104 and second gear 106 produces an equal and opposite reaction force urging driving pinion 104 away from second gear 106. In the illustration of FIG. 1C, $F_S$ the separation force between the driving pinion and the second gear, is balanced by $F_S$ the separation force between the driving pinion 104 and the first gear as illustrated in FIG. 1D.

Figure 1D:
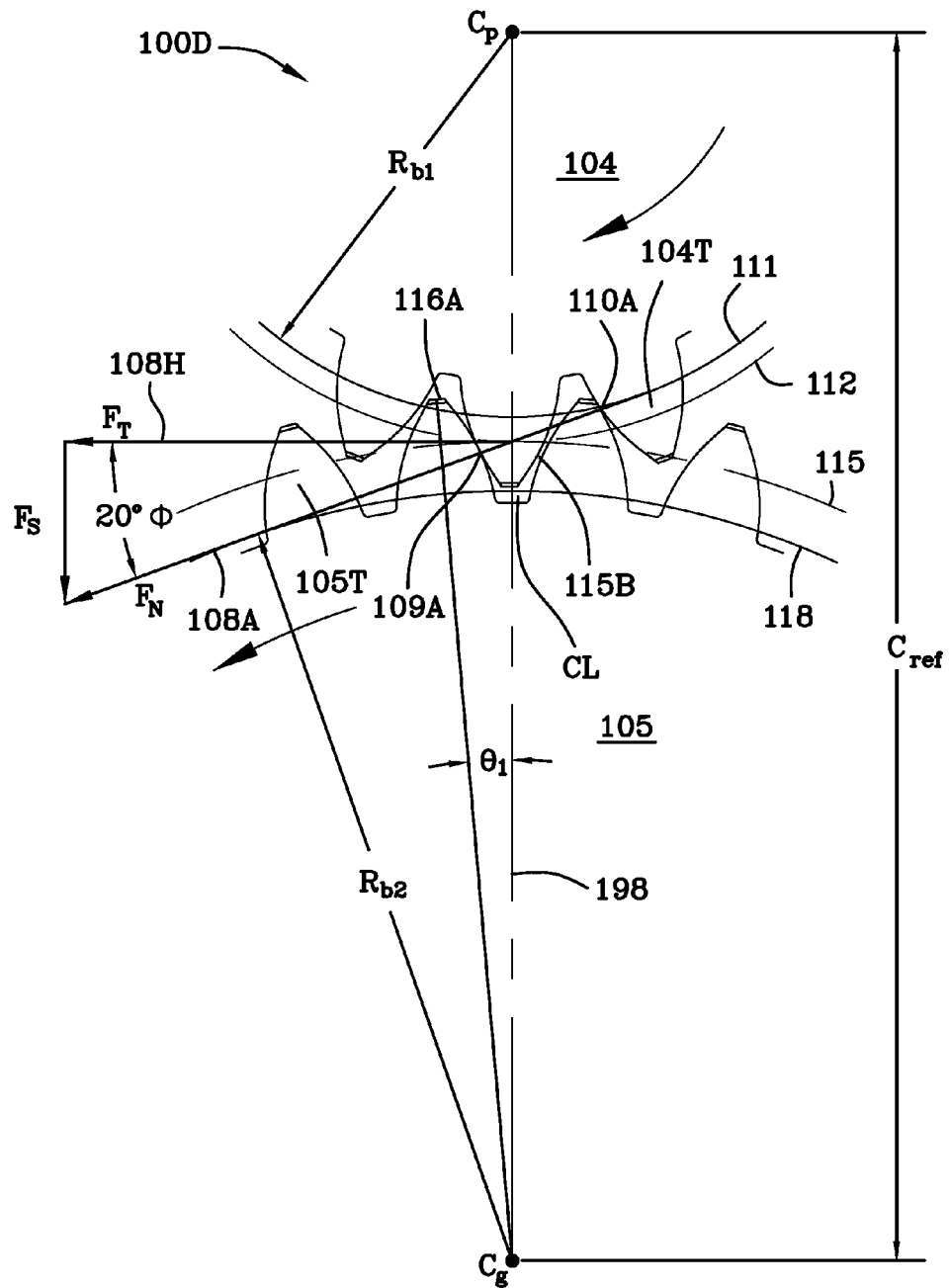
FIG. 1D is a schematic view of a portion of FIG. 1A illustrating the drive pinion and the first gear and force vectors.
Figure 1E:
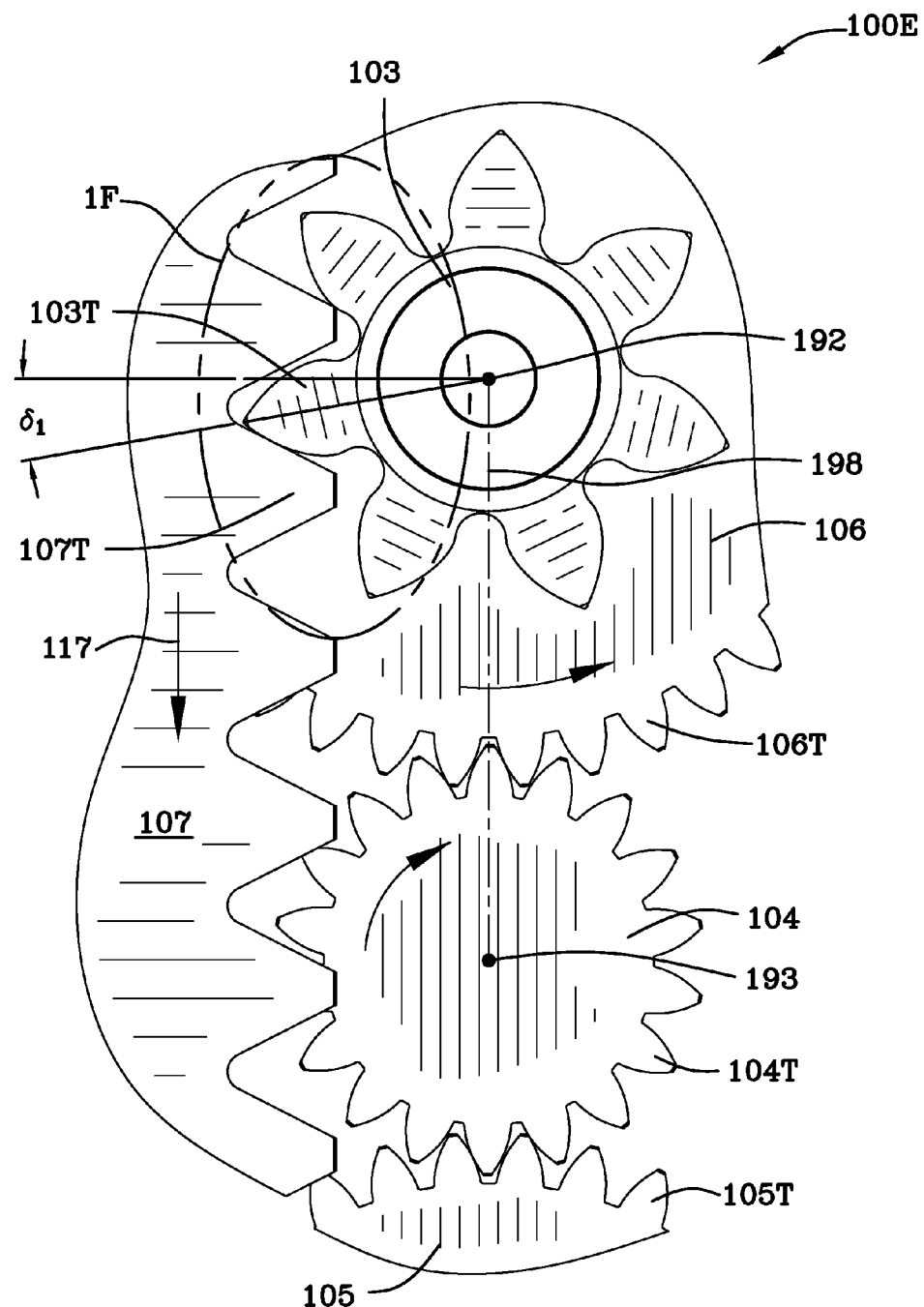
FIG. 1E is an enlargement of a portion of FIG. 1 illustrating the angle $\delta_1$, the initial angular position of one of the teeth of the second outer pinion with respect to the horizontal with approximately equal load sharing.
Figure 1F:
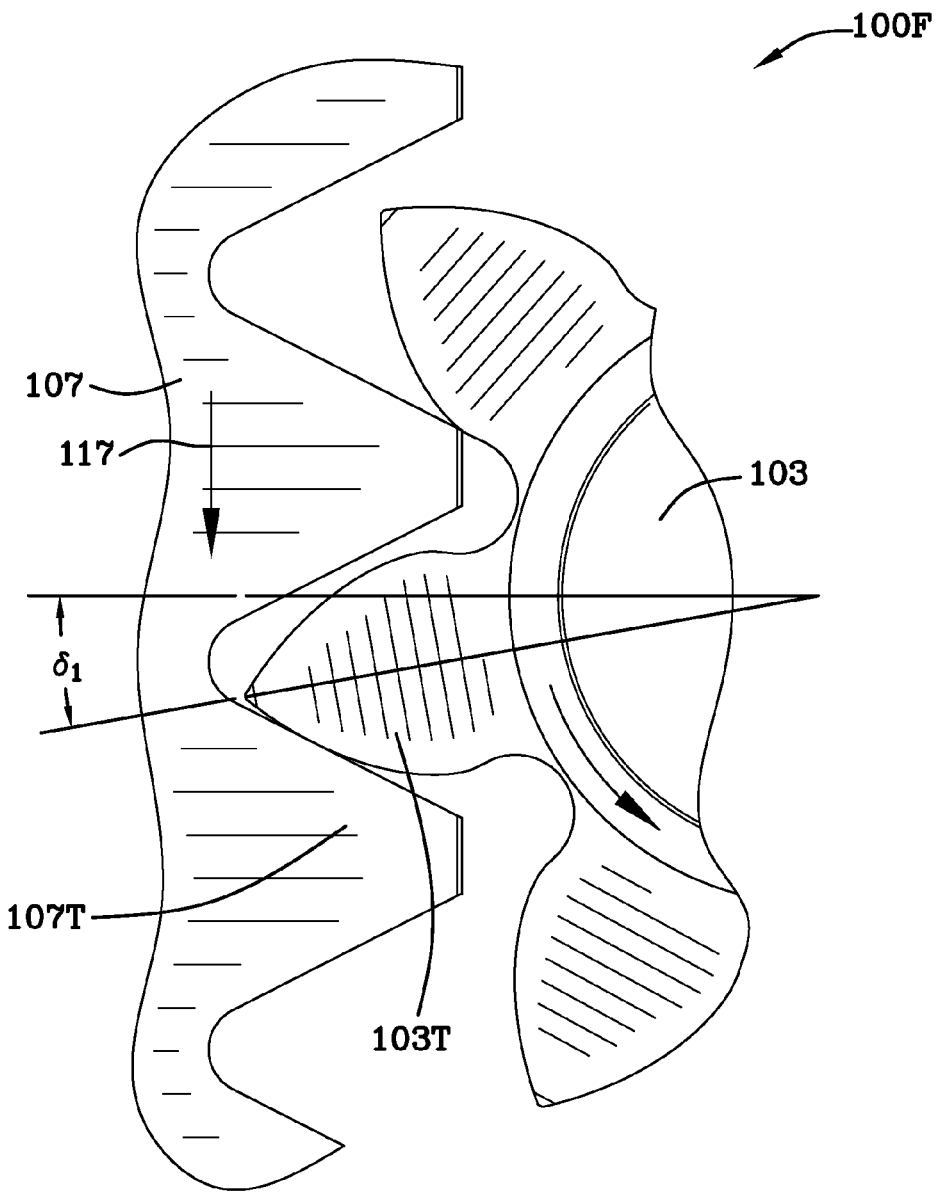
FIG. 1F is an enlargement of a portion of FIG. 1E illustrating the angle $\delta_1$.

FIG. 1D is a schematic view 100D of the drive pinion 104 and first gear 105 together with force vectors, namely, $F_T$ is the tangential force along the tangent of the pitch circles 112, 115 of driving pinion 104 and first gear 105, $F_S$ is the separation force between driving pinion 104 and first gear 105, and $F_N$ is the normal force along the line of action 108A oriented at the pressure angle, $\phi$. FIG. 1D illustrates the line of action 108A and the 20° pressure angle with points of contact 109A, 110A.

When referring to FIGS. 1C and 1D, equal and opposite reaction forces are generated which act on driving pinion 104 positioning it equidistantly intermediate first gear 105 and second gear 106. $F_S$ is indicated in opposite directions in FIGS. 1C and 1D meaning that driving pinion 104 experiences equal and opposite reaction forces which position driving pinion 104 intermediate fixed gears 105, 106.

Referring to FIGS. 1C and 1D, driving pinion 104 is in its home position and torque is being transmitted equally to first gear 105 and second gear 106 from driving pinion 104. The magnitudes of $F_S$, $F_N$, $F_T$ are equal as illustrated in FIGS. 1C and 1D and torque is being applied equally to first gear 105 and second gear 106. Further, first and second outer pinions 102, 103 are applying torque equally to the rack teeth 107T and rack 107 as illustrated in FIGS. 1 and 1A. Further, gears 105, 106 and outer pinions 102, 103 are rotationally in phase or substantially in phase as indicated in FIGS. 1C and 1D where $\theta_1$ is the angle between centerline 198 and the center of tip of gear tooth 116 when the driving pinion is centered between the driven gears 105, 106. $\theta_1$, illustrated in both FIGS. 1C and 1D, indicates that the first and second gears 105, 106 are in phase or substantially in phase.

The torque sharing drive is illustrated schematically in FIGS. 1, 1A, 1G, 1H, 6, 6A and 8, and comprises a driving pinion 104, a first gear 105 and a second gear 106 and other structure. In FIGS. 1 and 1A, driving pinion 104 is in its home position meaning that it is positioned equidistantly intermediate first gear 105 and second gear 106 (for example, substantially centered between first gear 105 and second gear 106) such that it is applying torque to both the first gear 105 and the second gear 106.

Driving pinion 104 includes teeth 104T, the first gear 105 includes teeth 105T, and the second gear 106 includes teeth 106T. The driving pinion includes vertically movable center 193, first gear 105 includes center 191, and second gear 106 includes center 192. All of the centers reside along a line 198, and the center 191 to center 192 distance of the first and second gear is fixed and does not change. Driving pinion 104 resides intermediate first gear 105 and second gear 106, the teeth 104T of driving pinion 104 meshing with teeth 105T of first gear 105 and teeth 106T of the second gear 106.

Driving pinion 104 and first gear 105 generates a first separation force therebetween. The first separation force is proportional to torque applied to first gear 105 by the driving pinion. See FIG. 1D wherein the separation force $F_S$ is illustrated when the driving pinion is positioned equidistantly intermediate the first and second gears.

Driving pinion 104 and second gear 106 generate a second separation force therebetween. The second separation force is proportional to torque applied to second gear 106 by the driving pinion. See FIG. 1C wherein the separation force $F_S$ is illustrated when the driving pinion is positioned equidistantly intermediate the first and second gears.

First gear 105 includes a first shaft 102A concentrically located with the center 191 of the first gear, the first gear 105 affixed to the first shaft 102A by a spline interconnection 102S. First gear 105 includes an internal spline and first shaft 102A includes a mating external spline. Second gear 106 includes a second shaft 103A concentrically located with the center 192 of second gear 106, the second gear 106 affixed to the second shaft 103A by a spline interconnection 103S. See FIGS. 3 and 4 which illustrate the spline interconnections 102S and 103S.

Figure 1G:
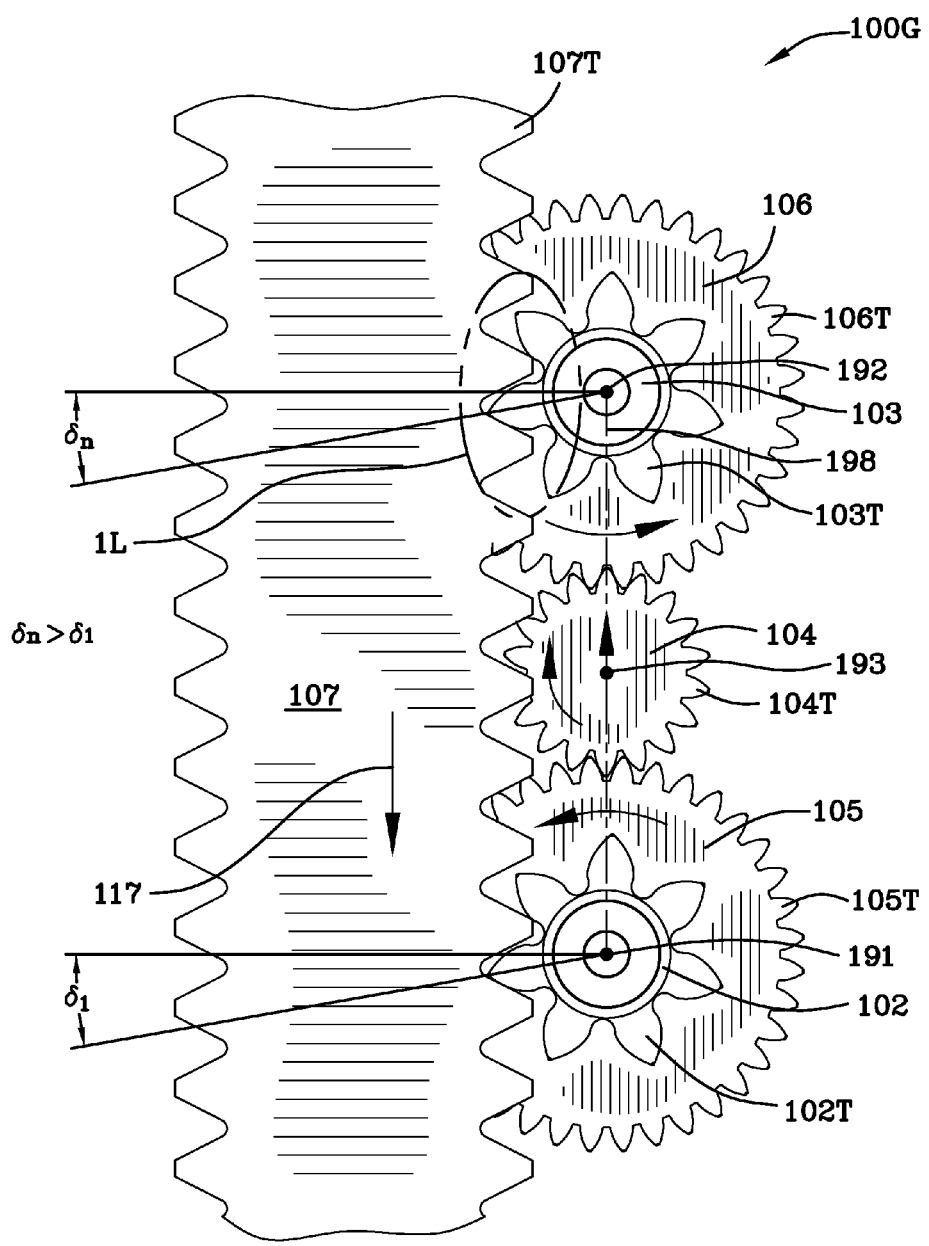
FIG. 1G is a schematic view of the rack and pinion drive illustrating the movable driving pinion thrust into the second gear.
Figure 1H:
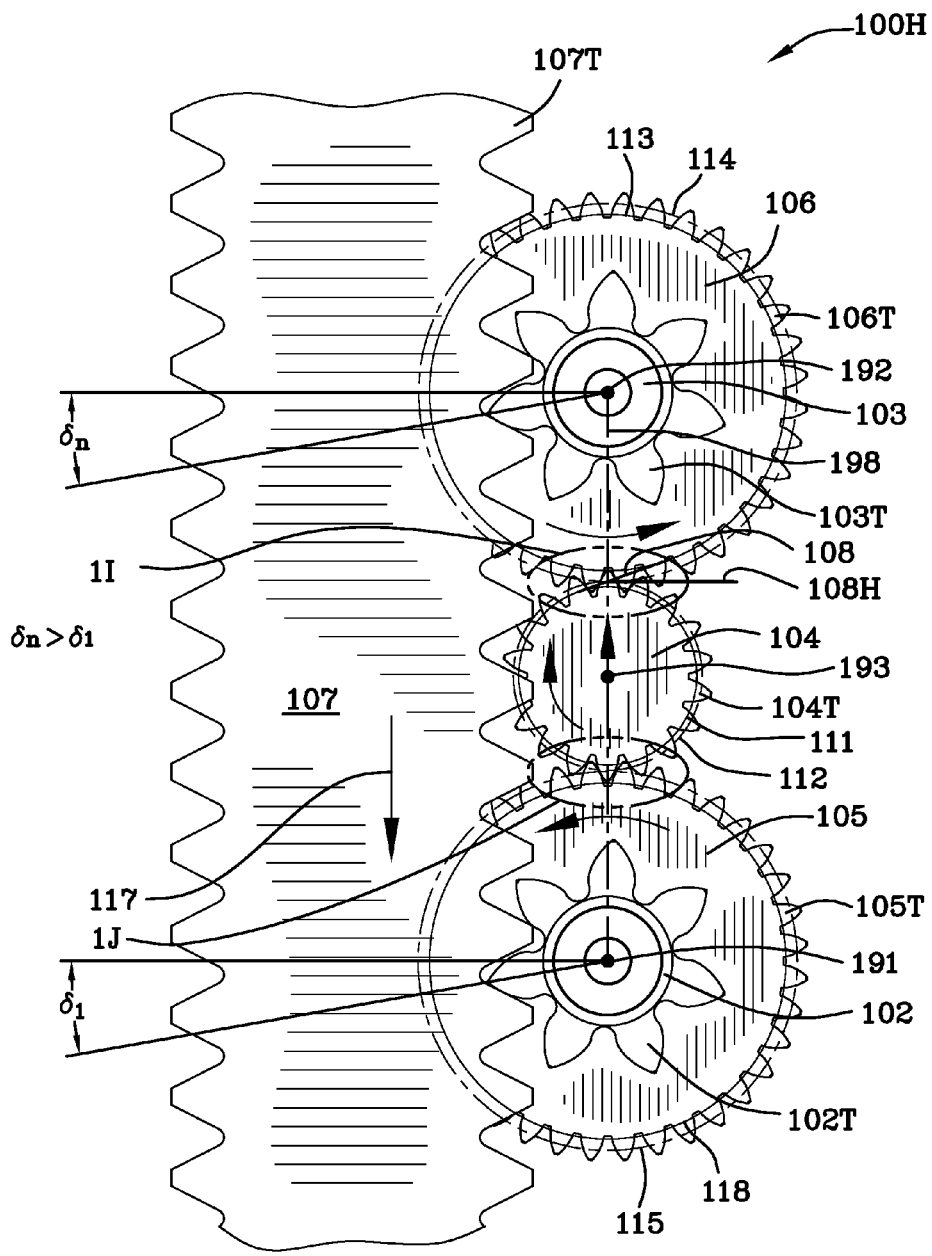
FIG. 1H is a schematic view of the rack and pinion drive similar to FIG. 1G illustrating the movable driving pinion thrust into the second gear with the pitch circles and base circles of the movable driving pinion, first gear and second gear.
Figure 1I:
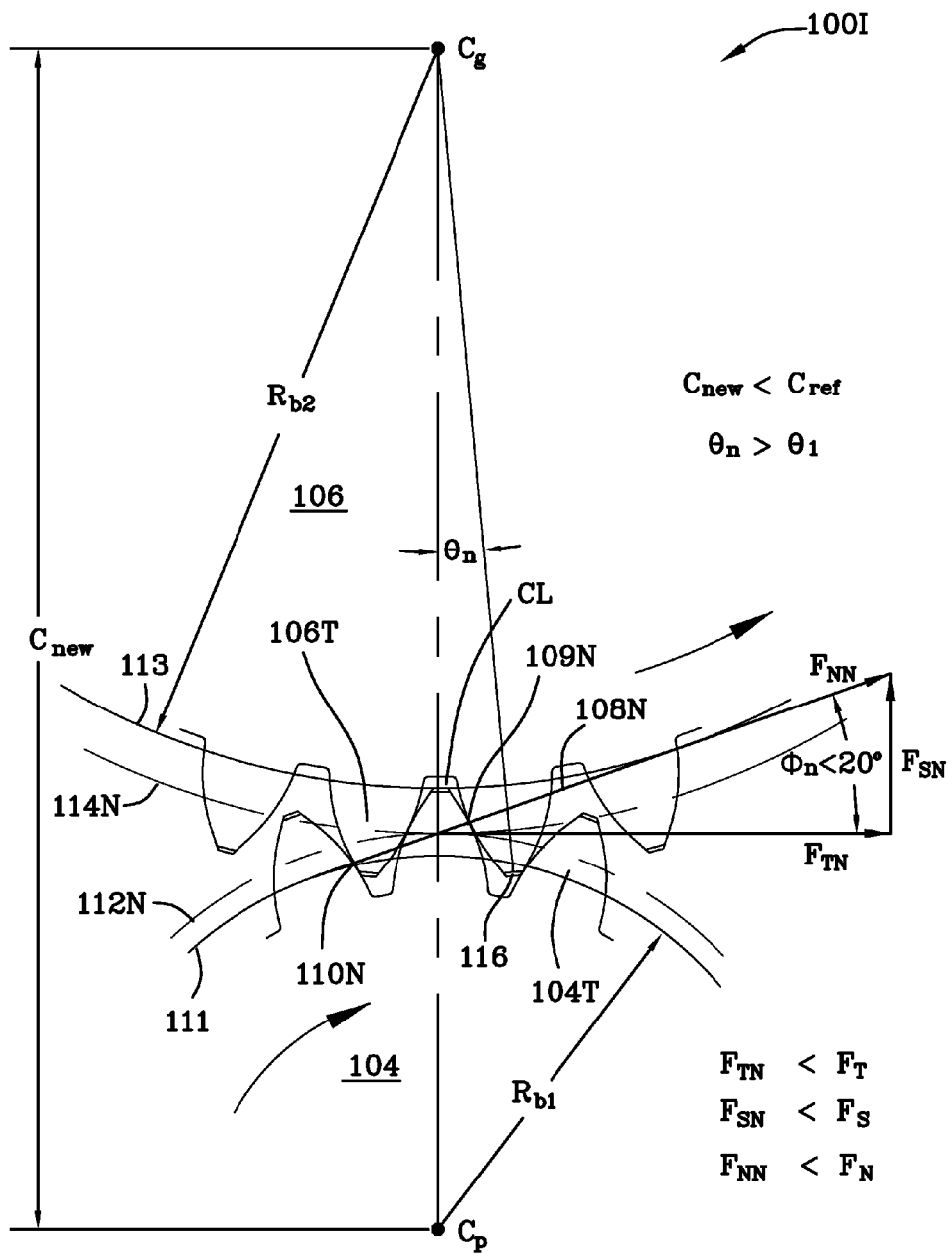
FIG. 1I is a schematic view of a portion of FIG. 1H illustrating the driving pinion and the second gear meshed together with a pressure angle less than 20°, the line of action, and pitch and base circles of the driving pinion and the second gear.
Figure 1J:
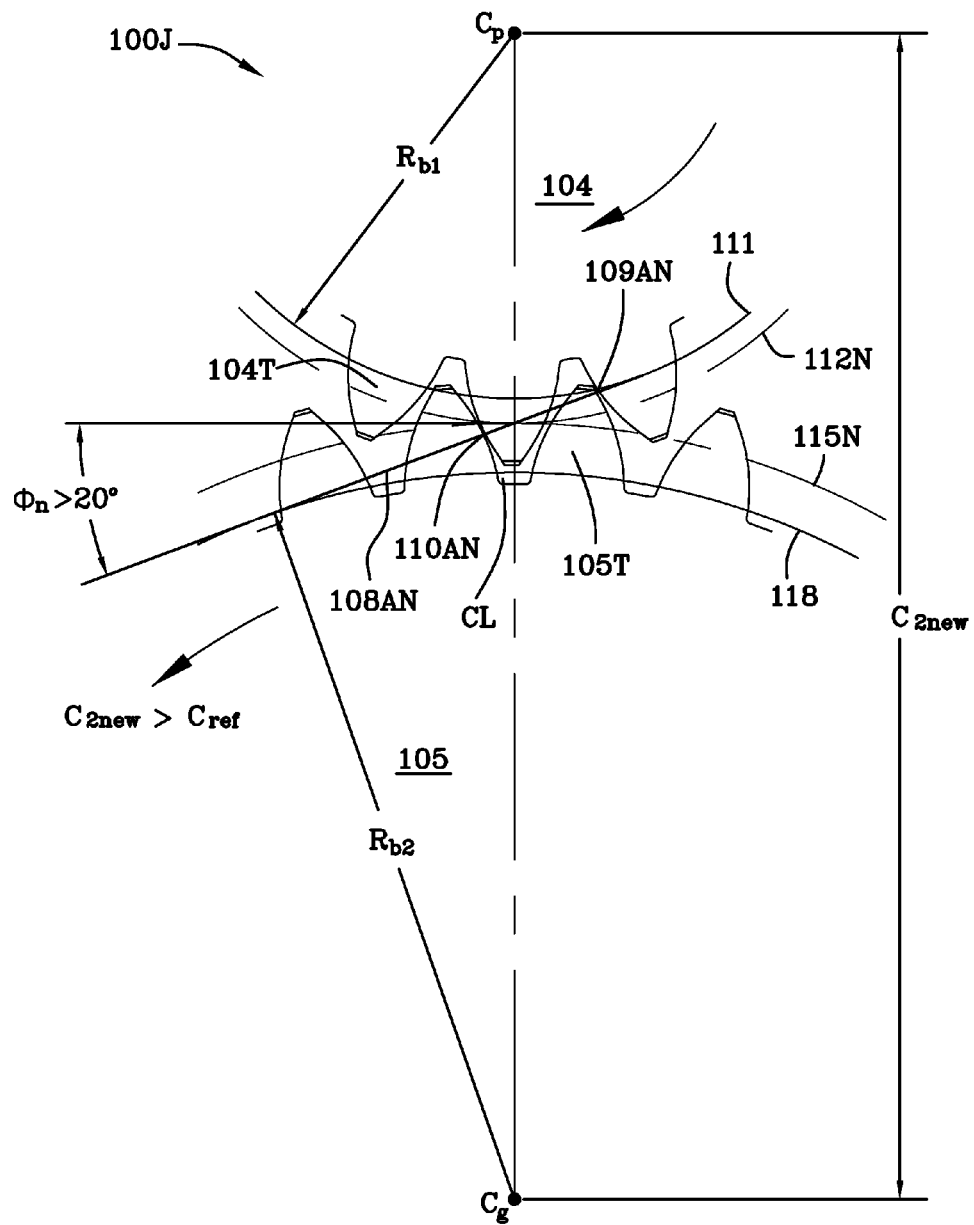
FIG. 1J is a schematic view of a portion of FIG. 1 illustrating the driving pinion and the first gear meshed together with a pressure greater than 20°, the line of action, and pitch and base circles of the driving pinion and the first gear.
Figure 1K:
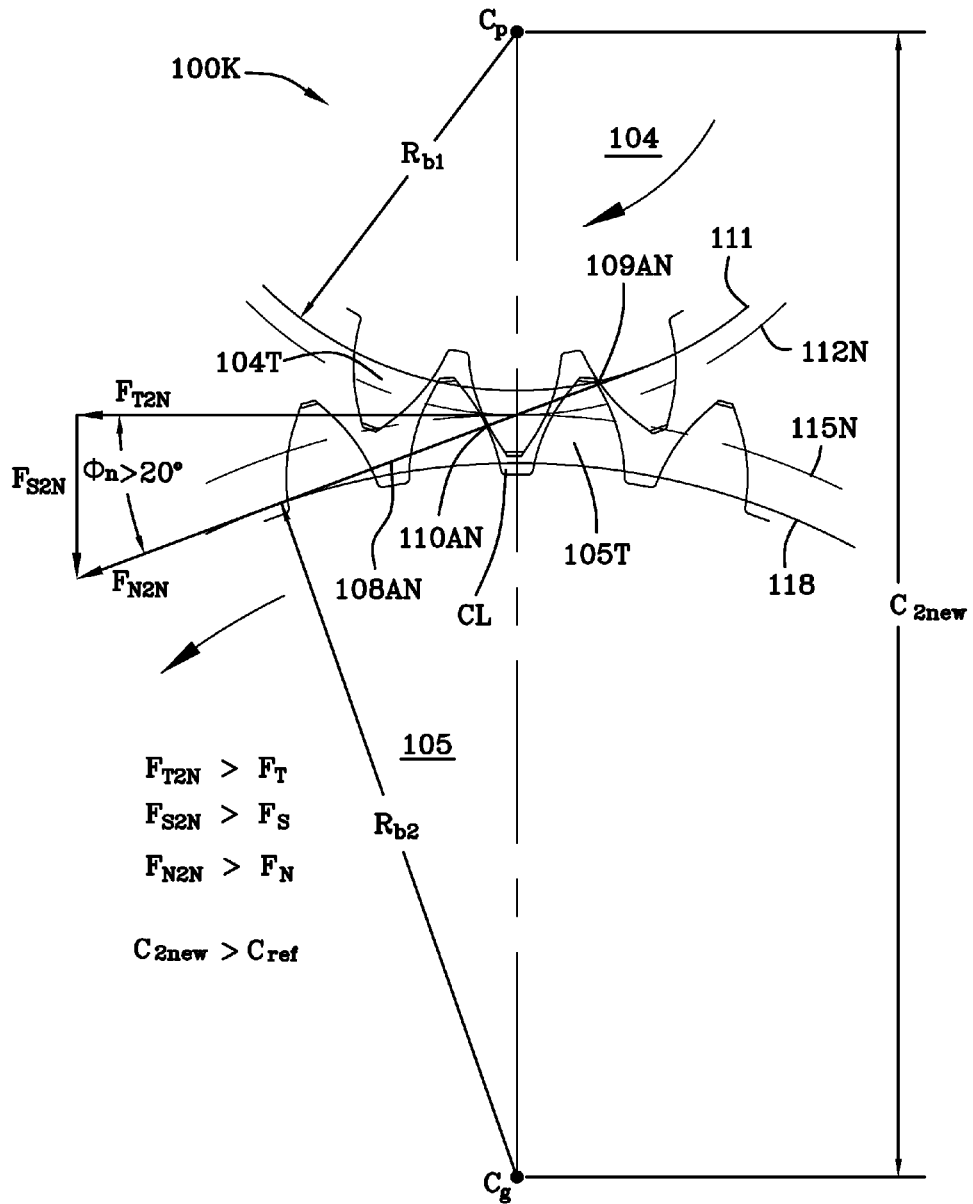
FIG. 1K is a schematic view similar to FIG. 1J together with force vectors.
Figure 1L:
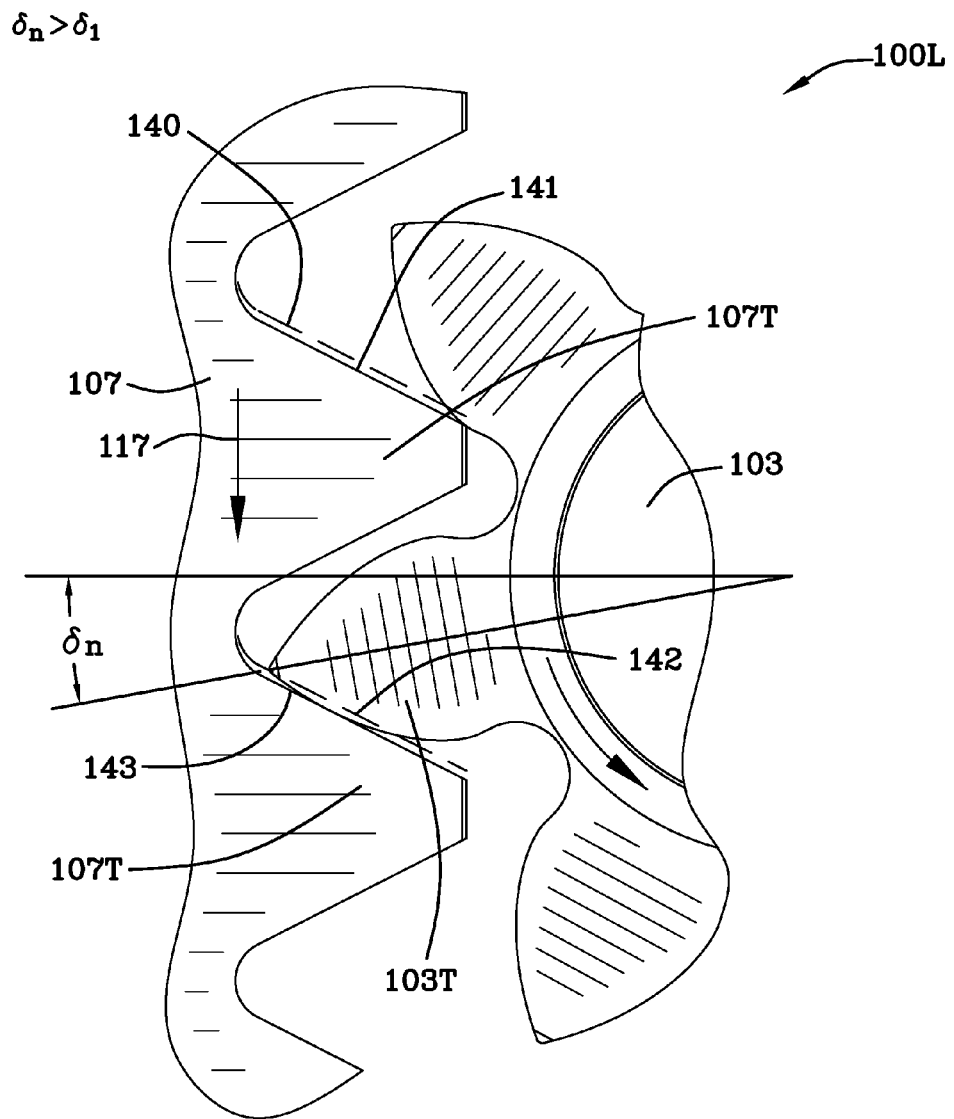
FIG. 1L is an enlargement of a portion of FIG. 1H illustrating the angle $\delta_n$, the advanced angular position of two teeth of the second outer pinion with respect to a horizontal line.
Figure 1M:
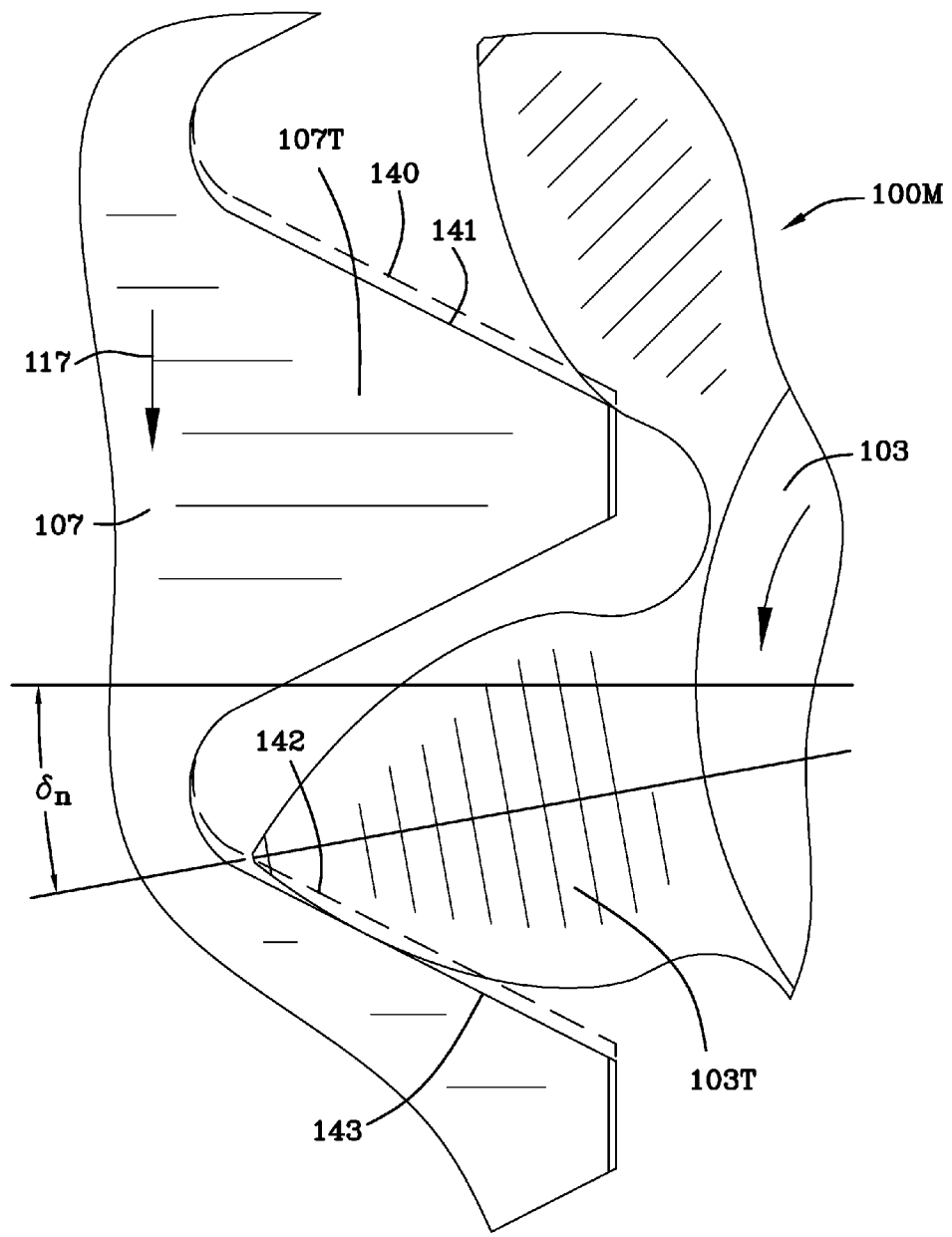
FIG. 1M is an enlargement of a portion of FIG. 1L illustrating the angle $\delta_n$, the advanced angular position of two successive rack teeth with imperfections which include dimensional variations/inaccuracies.
Figure 1N:
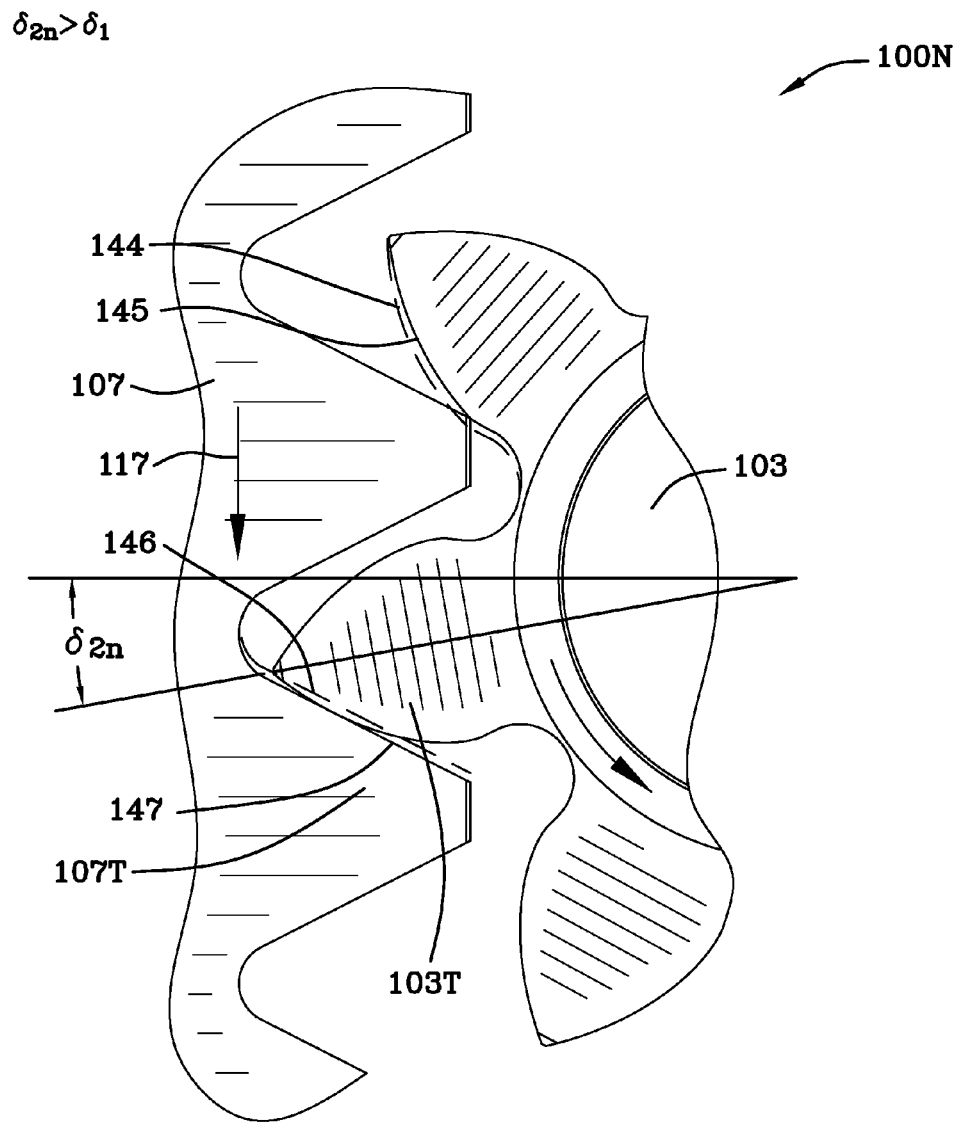
FIG. 1N is an enlarged view of a portion of the second outer pinion and a portion of the rack illustrating the second outer pinion with one tooth thereof having a profile imperfection which includes an inaccuracy and one rack tooth having a profile imperfection which includes an inaccuracy.
Figure 10:
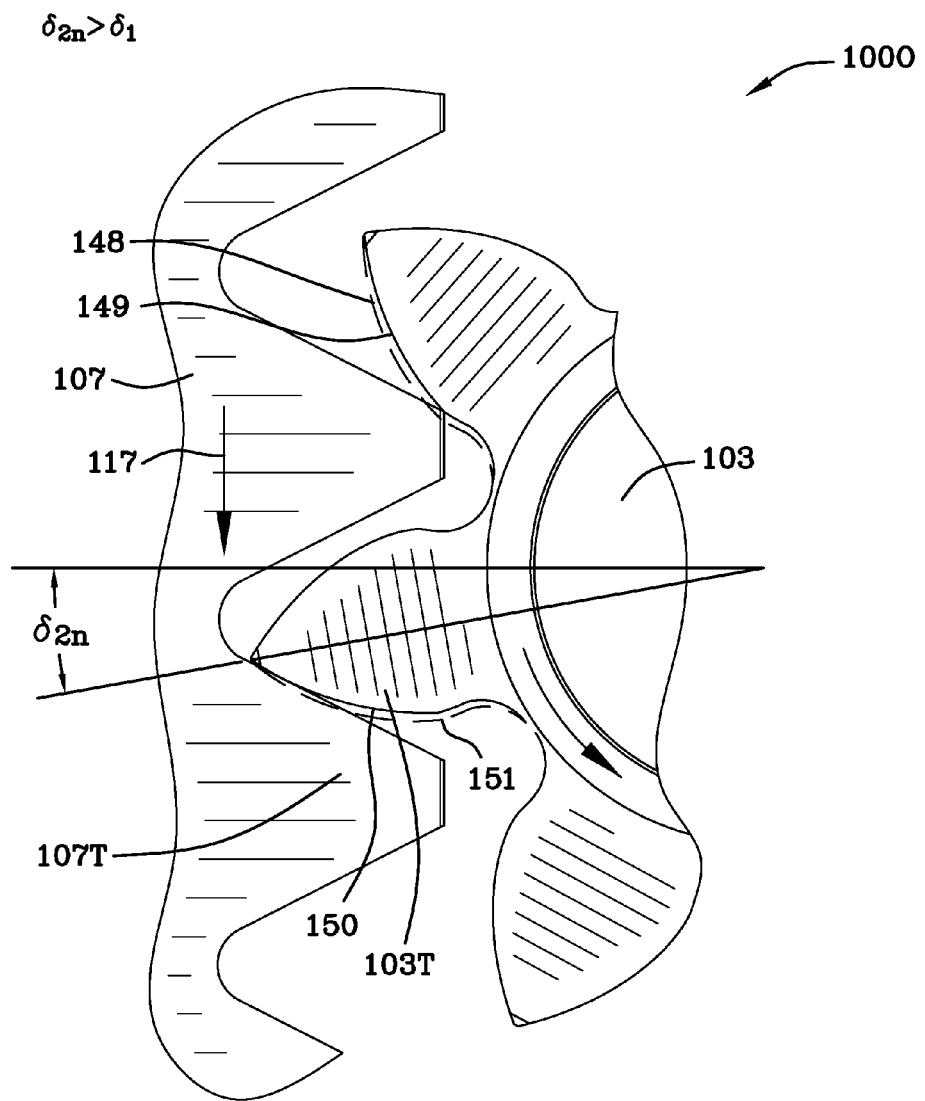

Rack 107 includes teeth 107T and a portion of the teeth 107T may include imperfections such as inaccuracies/dimensional variations as illustrated in FIGS. 1L, 1M, and 1N. First shaft 102A includes a first outer pinion 102 integral therewith.

The first shaft 102A is rotatable with first gear 105. The first outer pinion 102 includes teeth 102T which, when properly positioned, engage a first portion of the teeth of the rack. There may be no imperfections such as dimensional variations/inaccuracies in the first portion of the teeth 107T of the rack, for instance, those teeth illustrated in FIGS. 1G and 1H, which engage teeth 102T of first outer pinion 102. The first portion of rack teeth are illustrated in FIGS. 1F, 1G and 1L among other places.

Second shaft 103A includes a second outer pinion 103 integral therewith. The second shaft 103A is rotatable with second gear 106. The second outer pinion 103 includes teeth 103T which, when properly positioned, engage a second portion of the teeth of the rack. There may be no imperfections such as dimensional variations/inaccuracies in the second portion of the teeth 107T of the rack, for instance, those teeth illustrated in FIGS. 1 and 1A, which engage teeth 103T of first outer pinion 103. The second portion of rack teeth are those shown engaging second outer pinion teeth 103T in FIGS. 1 and 1G.

Driving pinion 104 is radially movable in response to the first and second separation forces along the line 198 between the centers 193, 191, 192 of the driving pinion 104, first gear 105 and the second gear 106.

As illustrated in FIGS. 1G, 1H, 1I, 1J, and 1K, when the separation force between the driving pinion and the first gear ($F_{S2N} > F_S$) is larger than the separation force between the driving pinion and the second gear ($F_{SN} < F_S$), the driving pinion 104 moves radially toward the second gear 106 and the second gear 106 and the second outer pinion 103 are angularly and rotationally advanced with respect to the first gear 106 and the first outer pinion 102. Alternatively, when the separation force between the driving pinion 104 and the second gear 106 is larger than the separation force between the driving pinion 104 and the first gear 105, the driving pinion 104 moves radially toward the first gear 104 and the first gear 105 and the first outer pinion 102 are angularly and rotationally advanced with respect to the second gear 106 and the second outer pinion 103.

FIG. 1I and other drawings illustrate the angular and rotational advancement of the second gear 106 wherein there is an imperfection such as a dimensional variation/inaccuracy on the first portion of teeth 107T which engage the first outer pinion 102. The description herein applicable to the driving pinion 104, second gear 106, and first gear 105, is equally applicable to imperfections such as inaccuracies and dimensional variations in the first portion of the teeth 107T and/or in imperfections such as inaccuracies and dimensional variations in the teeth 102T of the first outer pinion 102. FIG. 1I illustrates a new line of action 108N and a new pressure angle, $\phi_N < 20°$. Reference numerals 109N and 110N indicate new points of contact between mating teeth along the new line of action 108N. New pitch circles 112N, 114N are illustrated in FIG. 1I as well.

First gear 105 and second gear 106 supply variable torque resistances depending on various factors as described in greater detail hereinbelow. If there are imperfections such as inaccuracies/dimensional variations in the engagement of the first outer pinion 102 with rack 107 and there are imperfections such as inaccuracies/dimensional variations in the engagement of the second outer pinion 103 with rack 107, the driving pinion 104 moves radially to the degree necessary to balance the torque between gears 105, 106. The imperfections such as inaccuracies/dimensional variations may be in the pinion teeth 102T, 103T and/or in the first or second portion of rack teeth 107T.

Still alternatively, when the separation force between the driving pinion and the first gear equals the separation force between the driving pinion and the second gear, the driving pinion resides in the home position equidistantly intermediate the first and second gear, and, the first gear and the first outer pinion and the second gear and the second outer pinion are in phase or approximately in phase. See, FIGS. 1, 1A, 1B, and 1C.

A shared torque process includes the following steps: using a first outer pinion 102 and a second outer pinion 103 to drive a rack 107, wherein the first outer pinion 102 includes teeth 102T, the second outer pinion 103 includes teeth 103T, and the rack 107 includes teeth 107T including a first portion of teeth and a second portion of teeth.

The shared torque process further includes the step of a driving pinion 104 with a swivel connection 104S (spline connection 104S), wherein the driving pinion 104 includes teeth 104T and a center 193. The driving pinion 104 drives a first gear 105. A first shaft 104A is integral with the driving pinion 104. The first gear 105 includes: teeth 105T and a center 191 and the first shaft 102A is concentrically located with the center 191 of the first gear 105. First outer pinion 102 is driven and integral with the first shaft 102A. Although, for example, the first shaft 102A is integral with the first outer pinion 102, and although the second shaft 103A is integral with the second outer pinion 103, these elements/parts can be made of separate components. Also, outer pinions 102, 103 could be made integral with gears 105, 106.

The shared torque process includes the step of driving a second gear 106 with the driving pinion 104. The second shaft 103A is affixed to the second gear 106. The second outer pinion 103 is integral with the second shaft 103A. Second gear 106 includes: teeth 106T and a center 192 and the second shaft 103A is concentrically located with the center of the second gear 192. The shared torque process further includes the step of positioning the driving pinion 104 intermediate the first gear 105 and the second gear 106. The centers 193, 191, 192, of the driving pinion 104, the first gear 105 and the second gear 106 reside along a straight line, and, the center to center distance of the first and second gears is fixed. In other words, the first and second gears do not move off of their rotational centers which are fixed. The first and second gears are aligned with the center (along the common centerline) of the driving pinion 104. The center of the driving pinion 104 does move vertically on the line 198 of centers 191, 192, 193. Driving pinion 104 is free to move vertically when viewing FIGS. 1, 1A, 1E, 1G, 1H, 1I, and 1J. As stated previously herein FIGS. 1, 1A, and 1E illustrate the home position of the driving pinion 104 wherein the driving pinion 104 resides approximately mid-way between first gear 105 and second gear 106. Ideally, driving pinion 104 would reside exactly mid-way between first gear 105 and second gear 106, but it is likely that driving pinion 104 will be biased slightly due to tolerance stack-up as set forth above.

The shared torque process includes the step of applying torque, using the driving pinion, to the first gear. Referring to FIGS. 1 and 1A, torque is applied in the clockwise direction as indicated by the arrow on driving pinion 104. FIGS. 1 and 1A illustrate driving pinion 104 positioned mid-way or approximately mid-way between first gear 105 and second gear 106 along vertical line 198. Movement of driving pinion 104 is limited to vertical movement as illustrated in FIGS. 3 to 7 described and shown herein. Guide 320, illustrated in FIG. 5A and others, permits vertical movement of driving pinion 104 and prohibits horizontal movement of driving pinion 104. It will be understood by those skilled in the art that the directions of vertical and horizontal are arbitrary and the instant invention is equally applicable to applications wherein the rack 107 is oriented horizontally instead of vertically. So, there is no limitation as to orientation of the invention as shown herein by way of example. Additionally, the rack 107 may be oriented at an inclined angle.

FIG. 1B is an enlarged schematic view 100B of a portion of FIG. 1A wherein the driving pinion is in its home position. FIG. 1B illustrates the driving pinion 104 and the second gear 106 meshed together with a pressure angle of 20°, a line of action 108, and pitch 112, 114 and base circles 111, 113 of the driving pinion 104 and the second gear 106. FIG. 1C is a schematic view 100C similar to FIG. 1B together with force vectors, namely, $F_T$ is the tangential force along the tangent of the pitch circles of the driving pinion and the second gear, $F_S$ is the separation force between the driving pinion 104 and the second gear 106, and $F_N$ is the normal force along the line of action 108 oriented at the pressure angle $\phi$, where $\phi=20°$. The tangential force, the separation force, and the normal force as set forth in FIG. 1C are as follows:

$$F_T = T/PR$$

$$F_S = F_T \tan \phi$$

$$F_N = F_T / \cos \phi$$

where PR is the pitch radius of the driving pinion 104.

Applying torque, using the driving pinion, to the first gear 105 generates a first separation force $F_S$ between the driving pinion 104 and the first gear 105. See FIG. 1D wherein the separation force $F_S$ is illustrated for the home position of the driving pinion 104. The first separation force $F_S$ is proportional to torque applied to the first gear by the driving pinion as illustrated in FIG. 1D. The home position of the driving pinion illustrated in FIGS. 1, 1A, 1B. 1C, 1D and 1E of the driving pinion is not a chosen position, rather, the home position is the result of the accuracy of the gear train, namely, the accuracy of the gear teeth 102T of the first outer pinion 102, the accuracy of the gear teeth 103T of the second outer pinion 103, and, the accuracy of the rack 107 and the teeth of the rack 107T. Additionally, the home position of the driving pinion is the result of the accuracy of the angular alignment between the outer pinion 102 and first gear 105. Still additionally, the home position of the driving pinion is the result of the accuracy of the angular alignment between the outer pinion 103 and second gear 106. Additionally, and specifically contemplated herein, are the accuracies of the driving pinion 104 and its teeth 104T, and the accuracy of the gears 105, 106 and their teeth 105T, 106T. In other words, there may be inaccuracies/dimensional variations in the driving pinion 104 and/or in the gears 105, 106. By accuracy, it is meant dimensional accuracy of: tooth surfaces including face and flank surfaces, circular tooth thicknesses, circular pitch lengths, tooth spaces, lead/tooth alignment, and, diametral pitch inaccuracies. This identification of potential inaccuracies/dimensional variations is not meant to be exhaustive of inaccuracies encountered in gear design and manufacture. Inaccuracies further include items other than manufacturing inaccuracies/dimensional variations. For instance, a calculation error by a gear designer is within the definition of an inaccuracy. Rather, this listing is by way of example only and other inaccuracies/dimensional variations are specifically contemplated and included herein.

The shared torque process includes the step of applying torque, using the driving pinion 104, to the second gear 106. Applying torque, using the driving pinion 104, to the second gear 106 generates a second separation force $F_S$ between the driving pinion 104 and the second gear 106. See FIG. 1C wherein the separation force $F_S$ is illustrated for the home position of the driving pinion 104. The second separation force $F_S$ is proportional to torque applied to the second gear 106 by driving pinion 104 as illustrated in FIG. 1C. The home position of the driving pinion illustrated in FIGS. 1, 1A, 1B, 1C, 1D and 1E of the driving pinion is not a chosen position, rather, the home position is the result of the accuracy of the gear train, namely, the accuracy of the gear teeth 103T of the second outer pinion 103, the accuracy of the gear teeth 102T of the second outer pinion 102, and, the accuracy of the rack 107 and the teeth of the rack 107T. Additionally, and specifically contemplated herein are the accuracy of the driving pinion 104 and its teeth 104T, and the accuracy of the gears 105, 106. In other words, there may be inaccuracies/dimensional variations in the driving pinion 104 and its teeth 104T and/or in gears 105, 106 and/or their teeth.

Referring again to FIG. 1C which is a schematic view 100C similar to FIG. 1B together with force vectors, namely, $F_T$ is the tangential force along the tangent of the pitch circles of the driving pinion and the second gear, $F_S$ is the separation force between the driving pinion 104 and the second gear 106, and $F_N$ is the normal force along the line of action 108 oriented at the pressure angle $\phi$, where $\phi=20°$. Still referring to FIG. 1C, driving pinion 104 is rotating in the clockwise direction as denoted by the rotational arrow. Driving pinion 104 is illustrated in FIGS. 1, 1A, 1B and 1C driving second gear 106 in the counterclockwise direction as denoted by the rotational arrow.

Still referring to FIG. 1C, the normal force along the line of action is illustrated as $F_N$. Base circle 111 and pitch circle 112 of the driving pinion 104 are shown in FIG. 1C as are base circle 113 and pitch circle 114 of the second gear 106. Reference numeral 109 indicates the contact between a tooth 104T on driving pinion 104 and a tooth 106T on driven gear 106. Reference numeral 110 represents contact between another tooth 104T on driving pinion 104 and a tooth 106T on driven gear 106.

Still referring to FIG. 1C, $C_{REF}$ is the reference center to center distance of the driving pinion 104 and the second gear 106 with the driving pinion in the home position. Angle $\theta_1$ is the angle between centerline 198 and the center of gear tooth 116 when the driving pinion 104 is centered between the driven gear 105 and 106, to wit, when the driving pinion 104 is in the home position.

FIG. 1G is a schematic view 100G of the rack 107 and pinion drive 102, 103 illustrating the movable driving pinion 104 thrust into the second gear 106 due to an imbalance of the separation forces. When the separation force between the driving pinion 104 and the first gear 105 becomes greater than the separation force between the driving pinion 104 and the second gear 106, the driving pinion 104 moves radially toward the second gear 106, and the second gear 106 and the second outer pinion 103 angularly and rotationally advance the second gear 106 and the second outer pinion 103 with respect to the first gear 105 and the first outer pinion 102. FIG. 1H is a schematic view 100H of the rack and pinion drive similar to FIG. 1G illustrating the movable driving pinion 104 thrust into the second gear 106 along with the pitch circles 112, 115, 114 and base circles 111, 118, 113 of the movable driving pinion, first gear and second gear.

Still referring to FIGS. 1G and 1H, $\delta_n$ is an example of the advanced angular and rotational position of second outer pinion 103 when the driving pinion has been forced to mesh deeper with second gear with respect to $\delta_1$. $\delta_n > \delta_1$ when driving pinion is forced into second gear 106. $\delta_1$ is the initial angular position with respect to a horizontal line of the first outer pinion 102 and second outer pinion 103 with approximately equal load sharing when the driving pinion 104 is in its home position. FIG. 1L is an enlargement of a portion 100L of FIG. 1G, illustrating angle $\delta_n$, the advanced angular position of two of the teeth 103T of the second outer pinion 103 with respect to a horizontal line. FIG. 1L illustrates dimensional variations/inaccuracies in the second portion of the teeth 107T of rack 107. Specifically, reference numeral 140 indicates where the tooth 107T of the rack should be if no dimensional variations/inaccuracies were present and reference numeral 141 indicates where the tooth actually resides. Similarly, FIG. 1L indicates another inaccuracy/dimensional variation on another tooth wherein reference numeral 142 indicates where the tooth should be located if no inaccuracies/dimensional variations were present and reference numeral 143 indicates where the tooth actually resides. FIG. 1M is an enlargement of a portion 100M of FIG. 1L illustrating the angle $\delta_n$ and two successive rack teeth 107T with imperfections which include inaccuracies/dimensional variations.

Because $\delta_n > \delta 1$, angular advancement of first gear 105 and first outer pinion 103 occurs as the second outer pinion teeth 103T have nothing to push against. Pinion teeth 103T as shown in FIGS. 1L and 1M must travel further rotationally to contact and engage rack teeth 107T. FIGS. 1G and 1H illustrate that $\delta_n > \delta 1$ between second outer pinion 103 and first outer pinion 102.

FIG. 1N is an enlarged view 100N of a portion of the second outer pinion 103 and a portion of the rack 107 illustrating the second outer pinion 103 with one tooth 103T thereof having a profile imperfection which includes an inaccuracy/dimensional variation and one rack tooth 107T having a profile imperfection which includes an inaccuracy/dimensional variation. FIGS. 1L, 1M, 1N, and 1O illustrate the second portion of teeth 107T driven by outer pinion 103. The teeth 107T of the rack which engage the second outer pinion 103 are referred to as the second portion of the rack teeth and the teeth 107T of the rack which engage the first outer pinion 102 are referred to as the first portion of the rack teeth. Specifically, the rack 107 may have portions thereof that include inaccuracies/dimensional variations therein. The dimensional variations/inaccuracies may be different in each portion. The rack 107 may be created in sections and stacked one section on another section. The racks may be attached together and inaccuracies/dimensional variations due the connection of one section of rack with another are possible. Improper attachment can change the spatial characteristics of the teeth of the rack.

FIG. 1N illustrates inaccuracies/dimensional variations, to wit, where the tooth profile should be along the line of reference numeral 144 but in reality the profile is along the line denoted by reference numeral 145. Further, in the same portion of the rack there may be an inaccuracy/dimensional variation in the rack teeth, to wit, reference numeral 146 indicates where the tooth profile of the rack should be and reference numeral 147 indicates the location of the actual tooth profile. $\delta 2_n$ is another example of advanced angular and rotational position of second outer pinion 103 with respect to $\delta_1$.

FIG. 1O is an enlarged view 100O of a portion of the second outer pinion 103 and a portion of the rack, illustrating the second outer pinion 103 with two successive teeth 103T having profile imperfections which include inaccuracies/dimensional variations. Reference numeral 148 indicates where the tooth profile should be and reference numeral 149 indicates where the tooth profile actually resides. Similarly, reference numeral 151 indicates where the tooth profile of another tooth should be and reference numeral 150 indicates where the tooth profile actually resides.

Torque is supplied by the driving pinion 104 to the first gear 105 and the second gear 106. First gear 105 and second gear 106 supply variable torque resistances depending on various factors: including the engagement of the teeth 102T, 103T with the rack teeth 107T as illustrated in FIGS. 1, 1A, and 1F when the variable torque resistances experienced by the first and second gears 105, 106 are approximately the same; and, including the engagement or, put another way, the non-engagement of the teeth 102T, 103T with the rack teeth 107T as illustrated in FIGS. 1G, 1H, 1L, 1M, 1N and 1O, when the variable torque resistances experienced by the first and second gear 105, 106 are not the same.

FIG. 1I is a schematic view 100I of a portion of FIG. 1H illustrating the driving pinion 104 and the second gear 106 meshed together with a pressure angle less than 20°, the line of action 108N, and pitch 112N, 114N and base 111, 113 circles of the driving pinion 104 and second gear 106. $C_{NEW} < C_{REF}$ in FIG. 1I as the driving pinion 104 has been moved into a deeper mesh with second gear 106. As center to center distance becomes smaller, the operating pressure angle $\phi$ becomes smaller, and as center to center distance becomes larger, the operating pressure angle $\phi$ becomes larger. The following equation expresses the relationship for the change in the pressure angle due to a change in the center to center distance $\Delta\phi$:

$$\Delta\phi = \pm((\arccos((Rb1+Rb2)/C\text{ref})) - (\arccos((Rb1+Rb2)/C\text{new})))$$

where:

$C_{REF}$—is the reference center to center distance with driving pinion 104 equidistantly intermediate first gear 105 and second gear 106, for instance this is the center to center distance when the driving pinion is in its home position $C_{NEW}$—is the new center to center distance with driving pinion 104 moved vertically in the upward or downward direction $C_g$—center of gear $C_p$—center of radially and vertically movable driving pinion gear 104

Rb1=driving pinion base circle radius, a constant

Rb2=first and second gear base circle radius, a constant

Again referring to FIG. 1I, $\theta_n$ is the angle between centerline 198 and the center of gear tooth 116 when the driving pinion 104 moves toward driven second gear 106 pushing tooth 116 and angularly and rotationally advancing driven second gear 106 and tooth 116 with respect to driven gear 105. $\theta_n > \theta 1$ when driving pinion 104 is urged into deeper mesh with driven second gear. When second gear 106 is angularly and rotationally advanced, shaft 103A is angularly and rotationally advanced as is second outer pinion 103 and teeth 103T. An imperfection such as an inaccuracy in rack teeth 107T and/or a an inaccuracy in teeth 103T of the second outer pinion 103 permits angular and rotational advancement of second gear 106 with respect to the relative rotational position of first gear 105 and the first outer pinion 102. FIG. 1I also illustrates that $C_{NEW} < C_{REF}$ with respect to the new center to center distance after driving pinion 104 moves further into meshing engagement with second gear 106.

Driving pinion 104 is urged into deeper mesh with driven second gear 106, referring to FIGS. 1I, 1J and 1K, because the new separation force $F_{S2N}$ between the driving pinion 104 and the first gear 105 is larger than the separation force $F_{SN}$ between the driving pinion 104 and the second gear 106. When inaccuracies/dimensional variations exist in the teeth 107T of rack 107 as illustrated in FIG. 1L, for example, a temporary discontinuity of the mesh (interengagement) of teeth 103T of second outer pinion 103 with teeth 107T of rack 107 exists, thus torque applied to second gear 106 by driving pinion 104 becomes temporarily much lower than previously applied. By temporarily much lower it is meant that the torque supplied to the second outer pinion 103 would be much lower as the teeth 103T of second outer pinion 103 would not have anything to push against for a short duration of time. Driving pinion 104 adjusts radially quickly when there is an imbalance in separation forces. Torque supplied to second outer pinion 103 is temporarily lowered because the force of separation $F_S = F_T$ tab $\phi$ between the driving pinion 104 and the gear 106 would be temporarily and substantially lowered as the tangential force $F_T$ would be temporarily and substantially lowered. Meanwhile, on the other side of the gear train 104, 105, 106, the outer pinion teeth 102T, 103T are in engagement with teeth 107T of rack 107 as illustrated in FIGS. 1G and 1H and the full torque supplied by driving pinion 104 is temporarily applied to first gear 105 which is applied through shaft 102A to first outer pinion 102 and teeth 102T which are in direct engagement with teeth 107T of rack 107.

When imperfections such as inaccuracies/dimensional variations as illustrated in FIGS. 1L, 1M, 1N, and/or 1O occur, a discontinuity of torque applied by the driving pinion 104 to the second gear 106/outer pinion 103 causes a decrease in separation force between driving pinion 104 and second gear 106. See FIG. 1I such that:

$$F_{TN} < F_T$$

$$F_{SN} < F_S$$

$$F_{NN} < F_N$$

$$\theta_N > \theta_1$$

where, $F_{TN}$ is the temporary (new) tangential force which is proportional to the torque supplied by the driving pinion 104 to the second gear 106 and $F_T$ is the tangential force when driving pinion 104 is in the home position;

$F_{SN}$ is the temporary (new) separation force which is proportional to the torque supplied by the driving pinion 104 to the second gear 106 and $F_S$ is the separation force when driving pinion 104 is in the home position; and, $F_{NN}$ is the temporary (new) normal force which is proportional to the torque supplied by the driving pinion 104 to the second gear 106 and $F_N$ is the normal force when driving pinion 104 is in the home position.

When imperfections such as inaccuracies/dimensional variations as illustrated in FIGS. 1L, 1M, 1N, and/or 1O occur, a discontinuity of torque applied by the driving pinion 104 to the second gear 106/outer pinion 103 causes an increase in separation force between driving pinion 104 and first gear 105 such that:

$$F_{T2N} > F_T$$

$$F_{S2N} > F_S$$

$$F_{N2N} > F_N$$

$$C_{2NEW} > C_{REF}$$

where:

$F_{T2N}$ is the temporary (new) tangential force which is proportional to the torque supplied by the driving pinion 104 to the first gear 105 and $F_T$ is the tangential force when driving pinion 104 is in the home position;

$F_{S2N}$ is the temporary (new) separation force which is proportional to the torque supplied by the driving pinion 104 to the first gear 105 and $F_S$ is the separation force when driving pinion 104 is in the home position; and, $F_{N2N}$ is the temporary (new) normal force which is proportional to the torque supplied by the driving pinion 104 to the second gear 105 and $F_N$ is the normal force when driving pinion 104 is in the home position.

FIG. 1J is a schematic view 100J of a portion of FIG. 1 illustrating the driving pinion 104 and first gear 105 meshed together with a pressure angle greater than 20°, the line of action 108AN, and pitch 112N, 115N and base circles 111, 118 of the driving pinion 104 and the gear 105, respectively. The pressure angle $\phi$ is greater than 20° as the driving pinion 104 has been forced away from the center of first gear 105 under the influence of $F_{S2N}$, the temporary (new) separation force.

FIG. 1K is a schematic view 100K similar to FIG. 1J together with force vectors, namely, $F_{T2N}$, $F_{S2N}$, and $F_{N2N}$ illustrated. The pressure angle $\phi$ is greater than 20°, in other words, it has been increased from 20° which is the pressure angle when the driving pinion is in home position. Those skilled in the art will recognize that different pressure angles such as 14.5° or 25° or others may be used. Further, those skilled in the art will recognize that tooth profiles other than the preferred involute profiles may be used. Also, non-standard gear tooth geometry can be used, for example, long/short addendums, profile shifts, etc. FIG. 1K further illustrates a line of action 108AN, and tooth contact points 109AN, 110AN.

FIGS. 1J and 1K illustrate new pitch circles 112N and 115N and the change in the center to center distance, namely, $C_{2NEW} > C_{REF}$ as driving pinion 104 is being radially moved further into meshing engagement with second gear 106.

When angular and rotational advancement of the first or second gear occurs, the torque applied to the gears will equalize and the separation forces will equalize. Thereafter as the outer pinions 102, 103 continue to propel the torque sharing drive relative to the rack, and as correctly dimensioned teeth of the rack 107T are engaged by outer pinions 102, 103, the phase of the angularly and rotationally advanced gear is returned to the phase of the other gear and the drive pinion returns to the home position.

The shared torque process includes moving the driving pinion 104 radially toward the second gear 106, the second gear 106 and the second outer pinion 103 angularly and rotationally advance the second gear 106 and the second outer pinion 103 with respect to the first gear 105 and the first outer pinion 102 when the separation force between the driving pinion 104 and the first gear 105 is larger than the separation force between the driving pinion 104 and the second gear 106. Alternatively, when moving the driving pinion 104 radially toward the first gear 105, the first gear 105 and the first outer pinion 102 angularly and rotationally advance the first gear 105 and the first outer pinion 102 with respect to the second gear 106 and the second outer pinion 103 when the separation force between the driving pinion 104 and the second gear 106 is larger than the separation force between the driving pinion 104 and the first gear 105. Alternatively, positioning the driving pinion equidistantly between the first gear and the second gear occurs when the separation force between the driving pinion 104 and the first gear 105 equals the separation force between the driving pinion 104 and the second gear 106 and the first gear 105 and the first outer pinion 102 and the second gear 106 and the second outer pinion 103 are in phase or are approximately in phase.

Figure 1P:
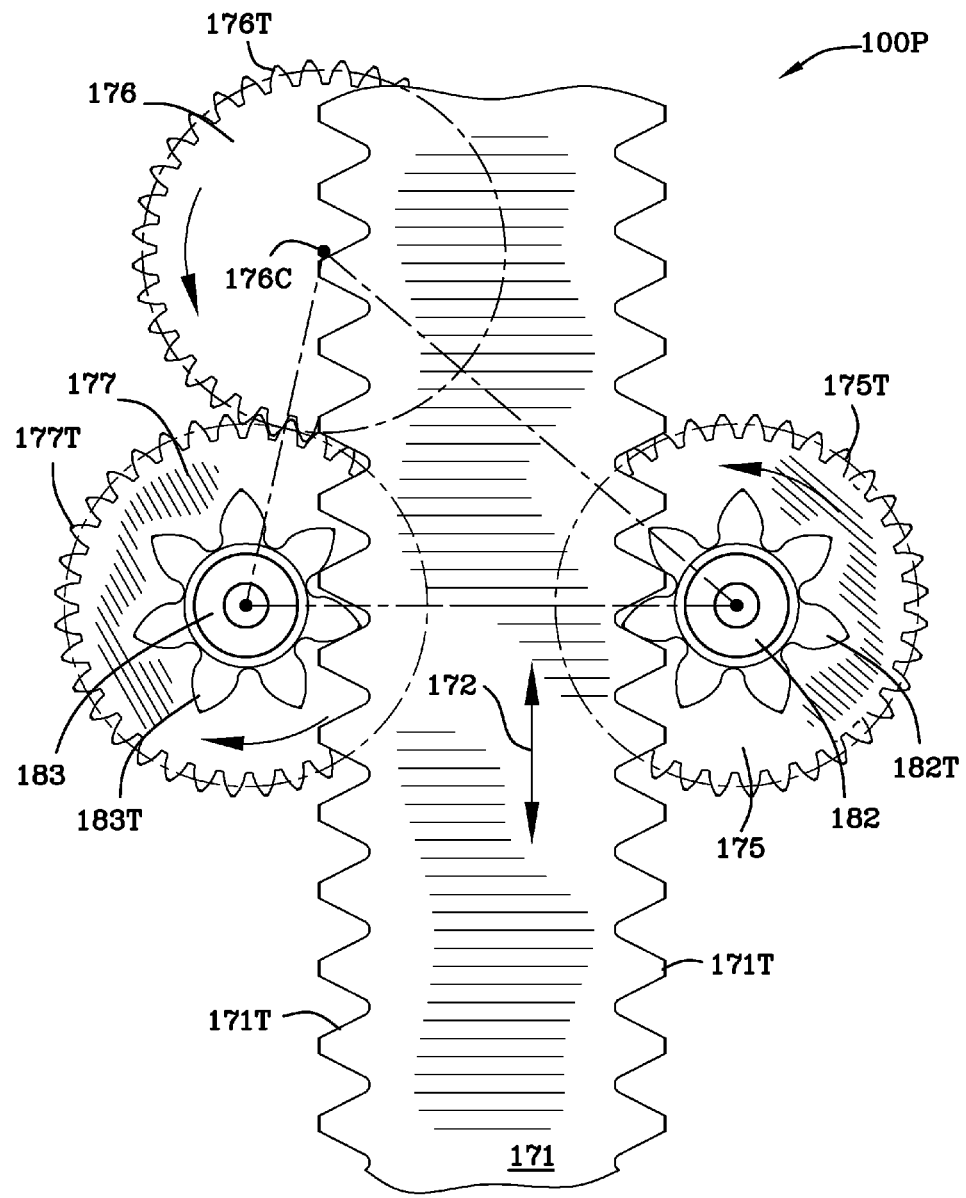
FIG. 1P is a schematic view of second example of a rack and pinion drive illustrating a rack driving first and second outer pinion.
Figure 1Q:
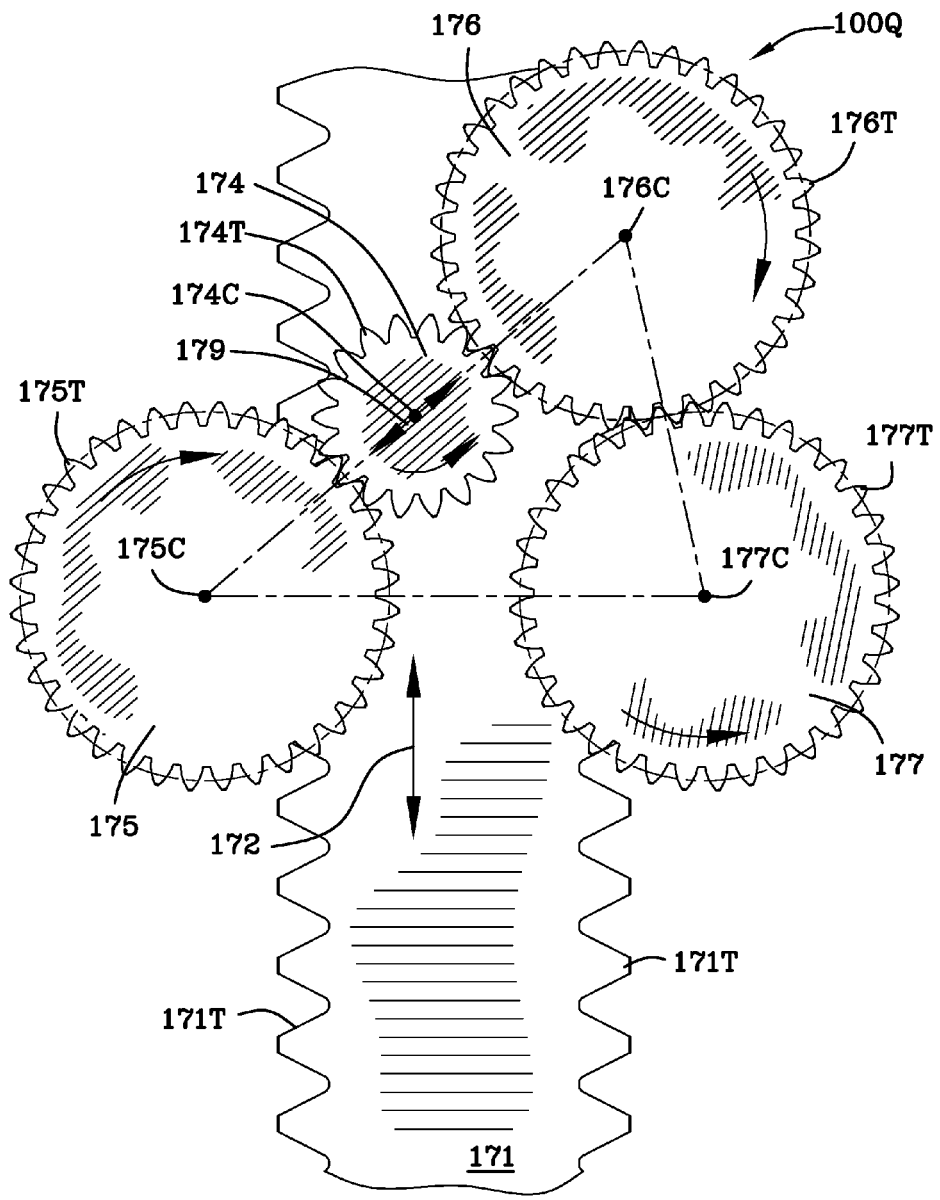
FIG. 1Q is a schematic view of the other side of the second example of a rack and pinion drive illustrated in FIG. 1P.

FIG. 1P is a schematic view 100P of a second example of a torque sharing rack and pinion drive illustrating first outer pinion 182 and a second outer pinion 183. First and second outer pinions 182, 183 drive the rack. FIG. 1Q is a schematic view 100Q of the other side of the second example of the rack and pinion drive illustrated in FIG. 1P.

Rack 171 is illustrated in FIGS. 1P and 1Q. A platform (not shown) is raised and lowered relative to rack 171 as illustrated by arrow 172. As illustrated in FIGS. 1P and 1Q, the platform is being raised relative to the rack 171. Referring to FIG. 1P, clockwise rotation of second outer pinion 183 and counterclockwise rotation of first outer pinion 182 will raise a platform connected to the torque sharing drive.

In the example of FIGS. 1P and 1Q, outer pinions 182, 183 include pinion teeth 182T, 183T which interengage rack teeth 171T. Outer pinions 182, 183 rotate in opposite directions to raise and lower the torque sharing drive and the platform.

Referring to FIG. 1Q, main driving pinion 174 is illustrated in engagement with idler gear 176 and first gear 175. Referring to FIG. 1Q, main driving pinion 174 is rotating in the counterclockwise direction causing first gear 175 to rotate in the clockwise direction and causing idler gear 176 to rotate in the clockwise direction. When idler gear 176 rotates in the clockwise direction, second gear 177 rotates in the counterclockwise direction. Second gear 177 includes teeth 177T which engage teeth 176T of the idler gear 176.

Main driving pinion 174 includes teeth 174T which mesh with teeth 176T of idler gear 176 and teeth 175T of first gear 175. Main driving pinion moves radially, bidirectionally, as indicated by arrow 179 along the line between center 175C and center 176C. Driving pinion 174 moves bidirectionally along the line indicated by arrow 179. Centers 175C, 176C, 177C are fixed in position and permit rotation of gears 175, 176, 177 therearound. Center 174C is movable as indicated by arrow 179 along the unnumbered line between fixed centers 175C, 176C.

As described above in connection with FIGS. 5, 5A and 5B, driving pinion 174 is restrained such that it may only move bidirectionally as indicated by arrow 179 on an unnumbered line between centers 175C, 174C, 176C. The structure illustrated in FIGS. 5, 5A and 5B is used to limit movement of driving pinion 174 as indicated by arrow 179 on the unnumbered line between center 175C, 174C, 176C.

Main driving pinion 174 moves in response to the load on first gear 177 and second gear 175. First outer pinion 182 is affixed to first gear 175. Alternatively, first outer pinion 182 may be integral with first gear 175. Second outer pinion 183 is affixed to second gear 177. Alternatively, second outer pinion 183 may be integral with second gear 177. Main driving pinion 174 interengages first gear 175 and idler gear 176 and moves in response to loads applied thereto as described hereinabove in connection with driving pinion 104, first gear 105 and second gear 106 and as set forth in FIGS. 1 through 1O, and FIGS. 2-8A.

Referring to FIGS. 1P and 1Q again, first gear 175, second gear 177 and idler gear 176 are identical such that they rotate in phase and at the same rotational speed when the load on the first and second outer pinions 182, 183 is the same. As described above, when the load on first and second outer pinions 182, 183 is not the same, then driving pinion 174 moves as required in the direction of arrow 179 to adjust the rotational position of first gear 175, idler gear 176, and second gear 177. Additionally, the rotational position of the second gear 177 is also adjusted as are the positions of the first and second outer pinions 182, 183.

Referring to FIG. 1P, outer pinions 182, 183 may encounter a portion or more than one portion of rack teeth 171T which include imperfections, dimensional variations, and inaccuracies as described herein. As the rack teeth 171T with imperfections and inaccuracies are encountered by outer pinion 182, 183, the position of the driving pinion is adjusted and the driven gears 175, 176, 177 are angularly and rotationally adjusted as described hereinabove.

LIST OF REFERENCE NUMERALS

100—is a schematic view 100 of the rack 107 and outer pinions 102, 103 illustrating the movable driving pinion 104 residing intermediate a first gear 105 and a second gear 106.

100A—is a schematic view 100A of the rack 107 and outer pinions 102, 103 similar to FIG. 1 illustrating pitch circles and base circles of the movable driving pinion 104, first gear 105 and second gear 106.

100B—is a schematic view of a portion of FIG. 1A illustrating the driving pinion and the second gear meshed together with a pressure angle of 20°, a line of action, and pitch and base circles of the driving pinion and the second gear.

100C—is a schematic view similar to FIG. 1B together with force vectors, namely, $F_T$ the tangential force along the tangent of the pitch circles of the driving pinion and the second gear, $F_S$ the separation force between the driving pinion and the second gear, and $F_N=F_T/\cos\phi$, normal force along the line of action oriented at the pressure angle.

100D—is a schematic view similar to FIG. 1B together with force vectors, namely, $F_T$ the tangential force along the tangent of the pitch circles of the driving pinion and the first gear, $F_S$ the separation force between the driving pinion and the first gear, and $F_N=F_T/\cos\phi$, normal force along the line of action oriented at the pressure angle.

100E—is an enlargement of a portion of FIG. 1 illustrating the angle $\delta_1$, the initial angular position of one of the teeth of the second outer pinion with respect to the horizontal with approximately equal load sharing.

100E—is an enlargement of a portion of FIG. 1E illustrating the angle $\delta_1$.

100G—is a schematic view of the rack and pinion drive illustrating the movable driving pinion thrust into the second gear.

100H—is a schematic view of the rack and pinion drive similar to FIG. 1G illustrating the movable driving pinion thrust into the second gear with the pitch circles and base circles of the movable driving pinion, first gear and second gear.

100I—is a schematic view of a portion of FIG. 1H illustrating the driving pinion and the second gear meshed together with a pressure angle less than 20°, the line of action, and pitch and base circles of the driving pinion and the second gear.

100J—is a schematic view of a portion of FIG. 1 illustrating the driving pinion and the first gear meshed together with a pressure greater than 20°, the line of action, and pitch and base circles of the driving pinion and the first gear.

100K—is a schematic view similar to FIG. 1J together with force vectors, namely, $F_{T2N}$ the tangential force along the tangent of the pitch circles of the driving pinion and the first gear, $F_{S2N}$ the separation force between the driving pinion and the first gear, and $F_{N2N}=F_T/\cos\phi$, the normal force along the line of action oriented at the pressure angle wherein the pressure angle is greater than 20°.

100L—is an enlargement of a portion of FIG. 1H illustrating the angle $\delta_n$ the advanced angular position of two of the teeth of the second outer pinion with respect to a horizontal line.

100M—is an enlargement of a portion of FIG. 1L illustrating the angle $\delta_n$ and two successive rack teeth with imperfections which include inaccuracies/dimensional variations.

100N—is an enlarged view of a portion of the second outer pinion and a portion of the rack illustrating the second outer pinion with one tooth thereof having a profile imperfection which includes an inaccuracy/dimensional variation and one rack tooth having a profile imperfection which includes an inaccuracy/dimensional variation.

100O—is an enlarged view of a portion of the second outer pinion and a portion of the rack illustrating the second outer pinion with two successive teeth having a profile imperfection which includes an inaccuracy/dimensional variations.

100P—is a schematic view of second example of a rack and pinion drive illustrating a rack driving first and second outer pinion.

100Q—is a schematic view of another side of a second example of a rack and pinion drive of FIG. 1P.

102—first outer pinion driving rack 107
102A—shaft of first outer pinion
102S—spline interconnection between shaft 102A and first gear 105
102T—teeth of first outer pinion 102
103—second outer pinion driving rack 107
103A—shaft of second outer pinion
103S—shaft interconnection between shaft 103A and second gear 106
103T—teeth of second outer pinion 103
104—main driving pinion (driving pinion) movable along one axis, the vertical axis, driving gears 105, 106
104A—shaft of driving pinion 104
104K—shoulder on driving pinion shaft 104A
104S—spline interconnection between torque driver 201 and driving pinion 104
104T—teeth of driving pinion 104
105—first gear meshing with driving pinion 104
105T—teeth of first gear 105
106—second gear meshing with driving pinion 104
106T—teeth of second gear 106
107—rack
107T—teeth of rack
108—line of action between driving pinion 104 and second gear 106 with the driving pinion 104 centered equidistantly intermediate first gear 105 and second gear 106
108A—line of action between driving pinion 104 and first gear 105 with the driving pinion 104 centered equidistantly intermediate first gear 105 and second gear 106
108H—horizontal line tangential to the driving pinion pitch circle 112 and the second gear pitch circle 114
108N—new line of action between driving pinion 104 and second gear 106 with the driving pinion 104 meshed further (deeper) with and into second gear 106
108AN—new line of action between driving pinion 104 and first gear 105 with the driving pinion 104 meshed less deep with and into the first gear 105
109, 109A, 109N, 109AN, 110, 110A, 110N, 110AN—point of contact
111—driving pinion base circle
112—driving pinion operating pitch circle, also defines pitch radius
112N—new operating pitch circle of driving pinion after radial movement of the driving pinion in the vertical direction
114N—new operating pitch circle of second gear 106 after radial movement of the driving pinion in the vertical direction
113—second gear base circle
114—second gear pitch circle
115—first gear pitch circle when driving pinion 104 is in its home position
115B—backlash
115N—first gear pitch circle when driving pinion 104 moves further into mesh with second gear 106
116—center of tooth of second gear 106
116A—center of tooth of first gear 105
117—relative direction of the rack
118—base circle of first gear 105
140, 142, 146—dashed line indicating where the tooth surface should be located on the rack
141, 143, 147—solid line indicating where the tooth surface is actually located on the rack
144, 148, 151—dashed line indicating where the tooth surface should be located on the tooth of the second outer pinion
145, 149, 150—solid line indicating where the tooth surface is actually located on the tooth of the second outer pinion
171—rack
172—arrow showing relative movement of the rack with respect to the pinions 182, 183
171T—teeth of rack 171
174—main driving pinion
174C—rotational center of main driving pinion
174T—teeth of main driving pinion
175—first gear meshing with main driving pinion 174
175C—rotational center of first gear 175
175T—teeth of first gear 175
176—idler gear with a fixed center about which rotation occurs
176C—fixed rotational center of idler gear 176
176T—teeth of idler gear 176
177—second gear driven by idler gear 176
177C—rotational center of second gear 177
177T—teeth of second gear 177
179—arrow indicating bidirectional movement of main driving pinion 174
182—first outer pinion
182T—teeth of first outer pinion 182 driving rack 171
183—second outer pinion
183T—teeth of second outer pinion driving rack 171
191—center of first gear 105 and first pinion 102
192—center of second gear 106 and second pinion 103
193—center of radially movable driving pinion 104 responding to loads on first gear 105, first outer pinion 102 and on second gear 106, second outer pinion 103
198—center line (vertical axis)
199—bidirectional arrow
200—cross-sectional schematic view of torque sharing drive
201—torque driver
201S—internal spline of torque driver 201
210, 211, 310, 311—housing/frame members
212, 213, 214, 215—bearings
300—enlargement of a portion of FIG. 2
311B—housing/frame restraining guide 320
311R—raised portion of housing/frame member 311
320—driving pinion shaft 104S guide
321—bushing in guide 320
400—enlargement of a portion of FIG. 2
401, 402—gap between guide 320 and housing 310 when driving pinion 104 is in home position
401N, 402N—gaps after guide 320 and driving pinion 104 have been moved radially and vertically
500—enlargement of a portion of FIG. 4
500A—cross-sectional view along the lines 5A-5A of FIG. 5
500B—cross-sectional view similar to FIG. 5A illustrating guide 320 moved upwardly and driving pinion 104 moved upwardly 501, 502—bushings which assist in preventing side to side movement of the guide 320
503—aperture for shaft 104A of the driving pinion
600—front schematic perspective view of driving pinion 104, cover 310, crowned external spline 104S, first gear 105 and second gear 106
600A—rear schematic perspective view of driving pinion 104, cover 310, crowned external spline 104S, first gear 105 and second gear 106
700—front schematic view of guide 320 within housing 311 without the cover 310 illustrating the movement of the guide within the housing 311
700A—front schematic view of guide 320 and bushings 501 and 502
701—shaft aperture/opening in guide 320
800—front schematic perspective of the driving pinion shifted radially and vertically upwardly into deeper meshing engagement with the second gear 106 and less deep meshing engagement with the first gear 105
800A—enlargement of torque driver 201
CCW—counterclockwise
CL—clearance between tip of tooth of driving pinion and root of driven gear
$C_{REF}$—reference center to center distance with driving pinion 104 intermediate first gear 105 and second gear 106
$C_{NEW}$—new center to center distance with driving pinion 104 and second gear 106
$C_g$—center of gear
$C_p$—center of vertically movable driving pinion gear 104
CW—clockwise
T—torque supplied by the driving pinion 104
$\theta_1$—angle between centerline 198 and center of gear tooth 116 when the driving pinion is centered between the driven gears 105, 106
$\theta_n$—angle between centerline 198 and center of gear tooth 116 when the driving pinion 104 moves toward driven gear 106
$\phi$—pressure angle
$\Delta\phi$—change in pressure angle as driving pinion 104 moves relative to gears 105, 106

$$\Delta\phi=\pm((\arccos((Rb1+Rb2)/Cref))-(\arccos((Rb1+Rb2)/Cnew)))$$

$\delta_1$—initial angular position of second outer pinion 103 with approximately equal load sharing
$\delta_n$—example of advanced angular and rotational position of second outer pinion with respect to $\delta_1$
$\delta 2_n$—another example of advanced angular and rotational position of second outer pinion with respect to $\delta_1$
$F_T$=T/PR, tangential force along the horizontal line tangent to the pitch circles of the driving pinion and the second gear
$F_S=F_T \tan\phi=F_S \sin\phi$, separation force between the driving pinion and the second gear
$F_N=F_T/\cos\phi$, normal force along pressure angle
$F_{TN}$=T/PR, new tangential force along the horizontal line tangent to the pitch circles of the driving pinion and the second gear
$F_{SN}=F_T \tan\phi$, new separation force between the driving pinion and the second gear
$F_{NN}=F_T/\cos\phi$, new normal force along increased pressure angle
Rb1=driving pinion base circle radius
Rb2=first and second gear base circle radius Those skilled in the art will recognize that the invention has been set forth by way of examples only and that changes and modifications may be made to the invention without departing from the spirit and the scope of the appended claims.

The invention claimed is:
1. A torque sharing drive, comprising:
a driving pinion, said driving pinion includes a plurality of teeth;
a first gear, said first gear includes a plurality of teeth;
a second gear, said second gear includes a plurality of teeth;
said driving pinion teeth meshing with said teeth of said first and second gears, said driving pinion driving said first gear and said second gear;
said driving pinion radially movable between said first gear and said second gear applying torque equally to said first and second gear;
said first and second gear driving a rack;
said rack includes teeth, said teeth of said rack include imperfections;
said driving pinion moves radially toward said second gear and said second gear is angularly and rotationally advanced with respect to said first gear; alternatively, said driving pinion moves radially toward said first gear and said first gear is angularly and rotationally advanced with respect to said second gear, alternatively, when said driving pinion resides approximately equidistantly intermediate said first and second gear, said first gear and said first outer pinion and said second gear and said second outer pinion are approximately in phase;
a driving spline;
said driving pinion includes a shaft, said shaft of said driving pinion includes a crowned spline meshing with said driving spline;
said driving pinion swivels with respect to said driving spline;
a guide, said guide includes an aperture therein;
a housing, said guide resides in said housing, and said guide movable within said housing;
said shaft of said driving pinion resides in said aperture of said guide; and,
said shaft of said driving pinion moves said guide within said housing.
2. A torque sharing drive as claimed in claim 1, wherein said driving spline is an internal spline and said crowned spline of said shaft of said driving spline is an external spline.
3. A torque sharing drive as claimed in claim 1 wherein said imperfections in said teeth include inaccuracies in tooth space width between teeth.
4. A torque sharing drive as claimed in claim 3 wherein said imperfections in said teeth include inaccuracies in two successive teeth.
5. A torque sharing drive as claimed in claim 1, further comprising:
inaccuracies in mounting of said first and second gears; and/or,
inaccuracies in mounting of said first and second outer pinions; and/or,
inaccuracies in alignment of said first and second gears; and/or,
inaccuracies in alignment of said first and second outer pinions.
6. A torque sharing drive as claimed in claim 1, wherein:
said first gear includes a first center, said second gear includes a second center and said driving pinion includes a movable center;
said first gear rotatable about said first center, said second gear rotatable about said second center, and said driving pinion rotatable about said movable center;
said first center of said first gear being fixed and said second center of said second gear being fixed; said first center, said second center and said movable center reside along a line; and, said driving pinion radially and bidirectionally movable between said first gear and said second gear along said line.

7. A torque sharing drive, comprising:
a driving pinion, a first gear and a second gear;
said driving pinion includes teeth, said first gear includes teeth and said second gear includes teeth;
said driving pinion includes a center, said first gear includes a center and said second gear includes a center;
said centers reside along a line, said center to center distance of said first and second gear being fixed;
said driving pinion resides intermediate said first gear and said second gear, said teeth of said driving pinion meshing with said teeth of said first gear and said teeth of said second gear;
said driving pinion and said first gear generate a first separation force therebetween, said first separation force proportional to torque applied to said first gear by said driving pinion;
said driving pinion and said second gear generate a second separation force therebetween, said second separation force proportional to torque applied to said second gear by said driving pinion;
said first gear includes a first shaft concentrically located with said center of said first gear, said first gear affixed to or integral with said first shaft;
said second gear includes a second shaft concentrically located with said center of said second gear, said second gear affixed to or integral with said second shaft;
a rack, said rack includes teeth, a portion of said teeth include inaccuracies;
said first shaft includes a first outer pinion integral therewith, said first shaft rotatable with said first gear, said first outer pinion includes teeth which, when properly positioned, engage a first portion of said teeth of said rack;
said second shaft includes a second outer pinion integral therewith, said second shaft rotatable with said second gear, said second outer pinion includes teeth which, when properly positioned, engage a second portion of said teeth of said rack;
said driving pinion radially movable in response to said first and second separation forces along said line between said centers of said driving pinion, said first gear and said second gear;
when said separation force between said driving pinion and said first gear is larger than said separation force between said driving pinion and said second gear, said driving pinion moves radially toward said second gear and said second gear and said second outer pinion are angularly and rotationally advanced with respect to said first gear and said first outer pinion; alternatively, when said separation force between said driving pinion and said second gear is larger than said separation force between said driving pinion and said first gear, said driving pinion moves radially toward said first gear and said first gear and said first outer pinion are angularly and rotationally advanced with respect to said second gear and said second outer pinion; and, alternatively, when said separation force between said driving pinion and said first gear equals said separation force between said driving pinion and said second gear, said driving pinion resides equidistantly intermediate said first and second gear, and, said first gear and said first outer pinion and said second gear and said second outer pinion are approximately in phase, and
the torque sharing drive further comprising:
a guide, said guide includes an aperture therein;
a housing, said guide resides in said housing, and said guide movable within said housing;
said shaft of said driving pinion resides in said aperture of said guide; and,
said shaft of said driving pinion moves said guide within said housing.

8. A torque sharing drive as claimed in claim 7, comprising:
said second gear and said second outer pinion are angularly and rotationally advanced with respect to said first gear and said first outer pinion when said teeth of said second outer pinion do not engage said second portion of said teeth of said rack; alternatively, said first gear and said first outer pinion are angularly and rotationally advanced with respect to said second gear and said second outer pinion when said teeth of said first outer pinion do not engage said first portion of said teeth of said rack; alternatively, said teeth of said first outer pinion engage said first portion of said teeth of said rack and said teeth of said second outer pinion engages said second portion of said teeth of said rack when said separation force between said driving pinion and said first gear equals said separation force between said driving pinion and said second gear.

9. A torque sharing drive as claimed in claim 7, further comprising:
a driving spline;
said driving pinion includes a shaft, said shaft of said driving pinion includes a crowned spline meshing with said driving spline; and,
said driving pinion shaft swivels with respect to said driving spline.

10. A torque sharing drive as claimed in claim 7 wherein said guide is hour-glassed shaped.

11. A torque sharing drive as claimed in claim 7, further comprising:
a swivel joint;
said driving pinion includes a shaft; and,
said swivel joint connected to said shaft of said driving pinion.

12. A torque sharing drive, comprising:
a driving pinion, a first gear and a second gear;
said driving pinion includes teeth, said first gear includes teeth and said second gear includes teeth;
said driving pinion includes a center of rotation, said first gear includes a center of rotation and said second gear includes a center of rotation;
said centers reside along a line, said center to center distance of said first and second gear being fixed;
said driving pinion resides intermediate said first gear and said second gear, said teeth of said driving pinion meshing with said teeth of said first gear and said teeth of said second gear;
said driving pinion radially movable between said first gear and said second gear applying torque equally to said first and second gear;
said first gear affixed to a first shaft concentrically located with said center of rotation of said first gear;
said second gear affixed to a second shaft concentrically located with said center of rotation of said second gear;
a rack, said rack includes teeth, a portion of said teeth include imperfections;
said first shaft includes a first outer pinion integral therewith rotatable with said first gear, said first outer pinion includes teeth engaging said teeth of said rack;

said second shaft includes a second outer pinion integral therewith rotatable with said second gear, said second outer pinion includes teeth engaging said teeth of said rack;

when said driving pinion moves radially toward said second gear, said second gear and said second outer pinion are angularly and rotationally advanced with respect to said first gear and said first outer pinion, alternatively, when said driving pinion moves radially toward said first gear, said first gear and said first outer pinion are angularly and rotationally advanced with respect to said second gear and said second outer pinion, and, alternatively, when said driving pinion resides equidistantly intermediate said first and second gear, said first gear and said first outer pinion and said second gear and said second outer pinion are approximately in phase, and the torque sharing drive further comprising:

a driving spline;

said driving pinion includes a shaft, said shaft of said driving pinion includes a crowned spline meshing with said driving spline;

said driving pinion swivels with respect to said driving spline;

a guide, said guide includes an aperture therein;

a housing, said guide resides in said housing, and said guide movable within said housing;

said shaft of said driving pinion resides in said aperture of said guide; and, said shaft of said driving pinion moves said guide within said housing.

13. A torque sharing drive as claimed in claim 12 wherein said imperfections in said teeth include inaccuracies in tooth space width between said teeth.

14. A torque sharing drive as claimed in claim 13 wherein said imperfections in said teeth include inaccuracies in at least two successive teeth.

15. A torque sharing device as claimed in claim 12 wherein said angular advancement of said first gear and said first outer pinion with respect to said second gear and said second outer pinion continues until a tooth of said first outer pinion engages a tooth of said rack.

16. A torque sharing drive as claimed in claim 12 wherein said angular advancement of said second gear and said second outer pinion with respect to said first gear and said first outer pinion continues until a tooth of said second outer pinion engages a tooth of said rack.

17. A torque sharing drive as claimed in claim 12, wherein said driving pinion resides equidistantly intermediate said first and second gear, said first gear and said first outer pinion and said second gear and said second outer pinion are approximately in phase and said teeth of said first outer pinion engage said rack and said teeth of said second outer pinion engage said rack.

18. A torque sharing drive as claimed in claim 12 wherein said imperfections in said teeth include inaccuracies in gear tooth spacing or index variation between teeth.

19. A torque sharing device as claimed in claim 12 wherein said angular advancement of said first gear and said first outer pinion with respect to said second gear and said second outer pinion continues until torque and separation forces on said first gear and said second gear are equal.

20. A torque sharing drive as claimed in claim 12 wherein said angular advancement of said second gear and said second outer pinion with respect to said first gear and said first outer pinion continues until torque and separation forces on said first gear and said second gear are equal.

21. A shared torque process, comprising the steps of:

using a first outer pinion and a second outer pinion to drive a rack, said first outer pinion includes teeth, said second outer pinion includes teeth, and said rack includes teeth including a first portion of teeth and a second portion of teeth;

driving a driving pinion with a swivel connection, said driving pinion includes teeth and a center;

driving a first gear with said driving pinion, a first shaft affixed to said first gear, and a first outer pinion integral with said first shaft, said first gear includes: teeth and a center and said first shaft concentrically located with said center of said first gear;

driving a first outer pinion with said first shaft, said first outer pinion integral with said first shaft;

driving a second gear with said driving pinion, a second shaft affixed to said second gear, and a second outer pinion integral with said second shaft, said second gear includes: teeth and a center and said second shaft concentrically located with said center of said second gear;

driving a second outer pinion with said second shaft, said second outer pinion integral with said second shaft;

positioning said driving pinion intermediate said first gear and said second gear, said centers of said driving pinion, said first gear and said second gear reside along a line, and, said center to center distance of said first and second gears being fixed;

applying torque, using said driving pinion, to said first gear;

generating a first separation force between said driving pinion and said first gear, said first separation force proportional to torque applied to said first gear by said driving pinion;

applying torque, using said driving pinion, to said second gear;

generating a second separation force between said driving pinion and said second gear, said second separation force proportional to torque applied to said second gear by said driving pinion;

rotating said first gear, said first shaft, and said first outer pinion, said teeth of said first outer pinion when properly positioned with said rack engage said first portion of said teeth of said rack;

rotating said second gear, said second shaft, and said second outer pinion, said teeth of said second outer pinion when properly positioned with said rack engage said second portion of said teeth of said rack;

moving said driving pinion radially along said line of said centers of said driving pinion, said first gear and said second gear in response to said first and second separation forces;

moving said driving pinion radially toward said second gear, said second gear and said second outer pinion angularly advancing said second gear and said second outer pinion with respect to said first gear and said first outer pinion when said separation force between said driving pinion and said first gear is larger than said separation force between said driving pinion and said second gear, alternatively, moving said driving pinion radially toward said first gear, said first gear and said first outer pinion angularly advancing said first gear and said first outer pinion with respect to said second gear and said second outer pinion when said separation force between said driving pinion and said second gear is larger than said separation force between said driving pinion and said first gear, and, alternatively, positioning said driving pinion equidistantly between said first gear and said second gear when said separation force between said driving pinion and said first gear equals said separation force between said driving pinion and said second gear and said first gear and said first outer pinion and said second gear and said second outer pinion are approximately in phase, and guiding said driving pinion along said line using a guide permitting vertical movement but not permitting horizontal movement.

22. A shared torque process as claimed in claim 21, wherein said driving pinion includes a shaft having an external crowned spline driven by a driver having an internal spline.

23. A shared torque process as claimed in claim 21, wherein said driving pinion includes a shaft and said shaft includes a swivel coupling.

24. A torque sharing drive, comprising:
a driving pinion, a first gear, an idler gear and a second gear;
said driving pinion includes teeth, said first gear includes teeth, said idler gear includes teeth and said second gear includes teeth;
said driving pinion includes a center, said first gear includes a center and said idler gear includes a center;
said centers of said driving pinion, said first gear and said idler gear reside along a line, said center to center distance of said first gear and said idler gear being fixed;
said driving pinion resides intermediate said first gear and said idler gear, said teeth of said driving pinion meshing with said teeth of said first gear and said teeth of said idler gear;
said driving pinion radially and bidirectionally movable between said first gear and said idler gear applying torque equally to said first and idler gear;
said first gear includes a first shaft concentrically located with said center of said first gear;
said second gear includes a second shaft concentrically located with said center of said second gear;
a rack, said rack includes a first side of said rack having teeth and said rack includes a second side of said rack having teeth, a portion of said teeth of said first side of said rack includes imperfections and a portion of said teeth of said second side of said rack includes imperfections;
said first shaft includes a first outer pinion integral therewith rotatable with said first gear, said first outer pinion includes teeth engaging said teeth of said first side of said rack;
said second shaft includes a second outer pinion integral therewith rotatable with said second gear, said second outer pinion includes teeth engaging said teeth of said second side of said rack;
when said driving pinion moves radially toward said idler gear, said idler gear is angularly and rotationally advanced, said gear and said second outer pinion are angularly and rotationally advanced with respect to said first gear and said first outer pinion, alternatively, when said driving pinion moves radially toward said first gear, said first gear and said first outer pinion are angularly and rotationally advanced with respect to said second gear and said second outer pinion, and, alternatively, when said driving pinion resides equidistantly intermediate said first gear and said idler gear, said first gear and said first outer pinion and said second gear and said second outer pinion are approximately rotationally in phase, and the torque sharing drive further comprising:
a guide, said guide includes an aperture therein;
a housing, said guide resides in said housing, and said guide movable within said housing;
said shaft of said driving pinion resides in said aperture of said guide; and,
said shaft of said driving pinion moves said guide within said housing.

25. A torque sharing drive, comprising:
a driving pinion, a first gear and a second gear;
said driving pinion includes teeth, said first gear includes teeth and said second gear includes teeth;
said driving pinion includes a center, said first gear includes a center and said second gear includes a center;
said centers reside along a line, said center to center distance of said first and second gear being fixed;
said center to center distance of said first and said second gear includes an imperfection that is an inaccuracy in or a misalignment of said first and second gears;
said driving pinion resides intermediate said first gear and said second gear, said teeth of said driving pinion meshing with said teeth of said first gear and said teeth of said second gear;
said driving pinion and said first gear generate a first separation force therebetween, said first separation force proportional to torque applied to said first gear by said driving pinion;
said driving pinion and said second gear generate a second separation force therebetween, said second separation force proportional to torque applied to said second gear by said driving pinion;
said first gear includes a first shaft concentrically located with said center of said first gear, said first gear affixed to or integral with said first shaft;
said second gear includes a second shaft concentrically located with said center of said second gear, said second gear affixed to or integral with said second shaft;
a rack, said rack includes teeth;
said first shaft includes a first outer pinion integral therewith, said first shaft rotatable with said first gear, said first outer pinion includes teeth which, when properly positioned, engage a first portion of said teeth of said rack;
said second shaft includes a second outer pinion integral therewith, said second shaft rotatable with said second gear, said second outer pinion includes teeth which, when properly positioned, engage a second portion of said teeth of said rack;
said driving pinion radially movable in response to said first and second separation forces along said line between said centers of said driving pinion, said first gear and said second gear;
when said separation force between said driving pinion and said first gear is larger than said separation force between said driving pinion and said second gear, said driving pinion moves radially toward said second gear and said second gear and said second outer pinion are angularly and rotationally advanced with respect to said first gear and said first outer pinion; alternatively, when said separation force between said driving pinion and said second gear is larger than said separation force between said driving pinion and said first gear, said driving pinion moves radially toward said first gear and said first gear and said first outer pinion are angularly and rotationally advanced with respect to said second gear and said second outer pinion; and, alternatively, when said separation force between said driving pinion and said first gear equals said separation force between said driving pinion and said second gear, said driving pinion resides equidistantly intermediate said first and second gear, and, said first gear and said first outer pinion and said second gear and said second outer pinion are approximately in phase, and the torque sharing drive further comprising:

a guide, said guide includes an aperture therein;

a housing, said guide resides in said housing, and said guide movable within said housing;

said shaft of said driving pinion resides in said aperture of said guide; and, said shaft of said driving pinion moves said guide within said housing.

\* \* \* \* \*